(12) United States Patent  
Oh

(10) Patent No.: US 12,526,522 B2  
(45) Date of Patent: Jan. 13, 2026

(54) CAMERA DEVICE

(71) Applicant: LG INNOTEK CO., LTD., Seoul (KR)

(72) Inventor: Jung Seok Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 145 days.

(21) Appl. No.: 18/275,317

(22) PCT Filed: May 20, 2022

(86) PCT No.: PCT/KR2022/007202  
§ 371 (c)(1),  
(2) Date: Aug. 1, 2023

(87) PCT Pub. No.: WO2022/245167  
PCT Pub. Date: Nov. 24, 2022

(65) Prior Publication Data  
US 2024/0155235 A1 May 9, 2024

(30) Foreign Application Priority Data  
May 21, 2021 (KR) .................. 10-2021-0065818

(51) Int. Cl.  
*H04N 23/68* (2023.01)  
*G03B 5/04* (2021.01)  
*G03B 13/36* (2021.01)  
*H04N 23/54* (2023.01)  
*H04N 23/55* (2023.01)  
*H04N 23/57* (2023.01)

(52) U.S. Cl.  
CPC ............. *H04N 23/687* (2023.01); *G03B 5/04* (2013.01); *G03B 13/36* (2013.01); *H04N 23/54* (2023.01); *H04N 23/55* (2023.01); *H04N 23/57* (2023.01); *G03B 2205/0038* (2013.01); *G03B 2205/0069* (2013.01)

(58) Field of Classification Search  
None  
See application file for complete search history.

(56) References Cited

U.S. PATENT DOCUMENTS

| 7,692,689 | B2 * | 4/2010 | Teramoto ........... H04N 23/6812 |
| | | | 348/208.7 |
| 10,911,656 | B2 * | 2/2021 | McMillan ............. H04N 7/144 |
| 2006/0272328 | A1 | 12/2006 | Hara et al. |
| 2007/0025710 | A1 | 2/2007 | Shin et al. |

(Continued)

FOREIGN PATENT DOCUMENTS

| CN | 110199224 A | 9/2019 |
| EP | 3 588 185 A1 | 1/2020 |

(Continued)

*Primary Examiner* — Quan Pham  
(74) *Attorney, Agent, or Firm* — Birch, Stewart, Kolasch & Birch, LLP

(57) ABSTRACT

An embodiment of the present invention relates to a camera device comprising: a lens; an image sensor disposed under the lens; and an OIS drive unit for moving the image sensor relative to the lens in a direction perpendicular to the optical axis direction; and a plurality of wires electrically connected to the image sensor, wherein some of the plurality of wires have a larger diameter than the other wires.

20 Claims, 15 Drawing Sheets

(56) References Cited

U.S. PATENT DOCUMENTS

| | | | | |
|---|---|---|---|---|
| 2008/0017942 A1* | 1/2008 | Kosaka | ................ | H04N 23/57 |
| | | | | 257/E31.127 |
| 2011/0286732 A1 | 11/2011 | Hosokawa et al. | | |
| 2016/0241787 A1* | 8/2016 | Sekimoto | ................ | G02B 7/09 |
| 2021/0195073 A1* | 6/2021 | Saito | ................ | H04N 23/60 |
| 2022/0093673 A1* | 3/2022 | Do | ................ | H10F 39/804 |
| 2022/0337753 A1 | 10/2022 | Oh | | |

FOREIGN PATENT DOCUMENTS

| | | | | |
|---|---|---|---|---|
| EP | 3 608 715 A1 | 2/2020 | | |
| JP | 2011-247909 A | 12/2011 | | |
| KR | 10-2015-0042690 A | 4/2015 | | |
| KR | 10-2017-0110298 A | 10/2017 | | |
| KR | 10-2021-0026659 A | 3/2021 | | |
| KR | 10-2021-0029751 A | 3/2021 | | |
| WO | WO-2013118503 A1 * | 8/2013 | ........... | G02B 13/001 |
| WO | WO 2021/040397 A1 | 3/2021 | | |

* cited by examiner

【FIG. 1】
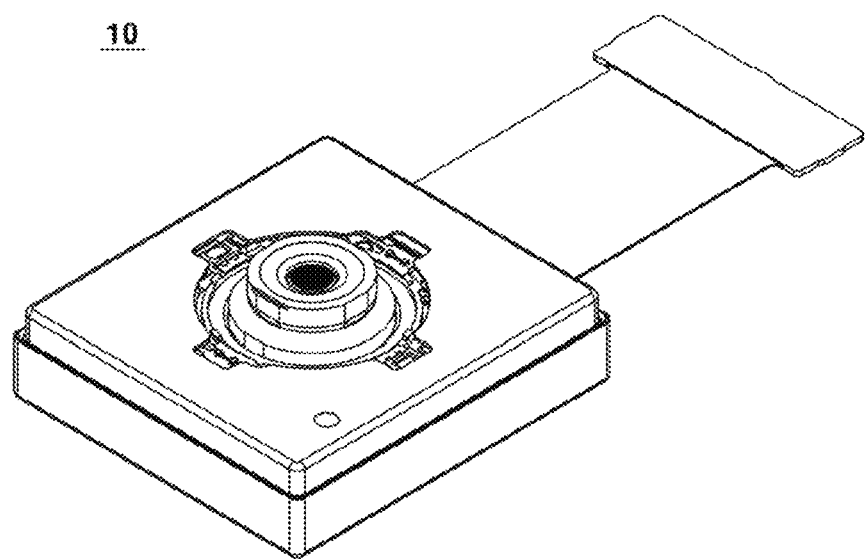
【FIG. 2】
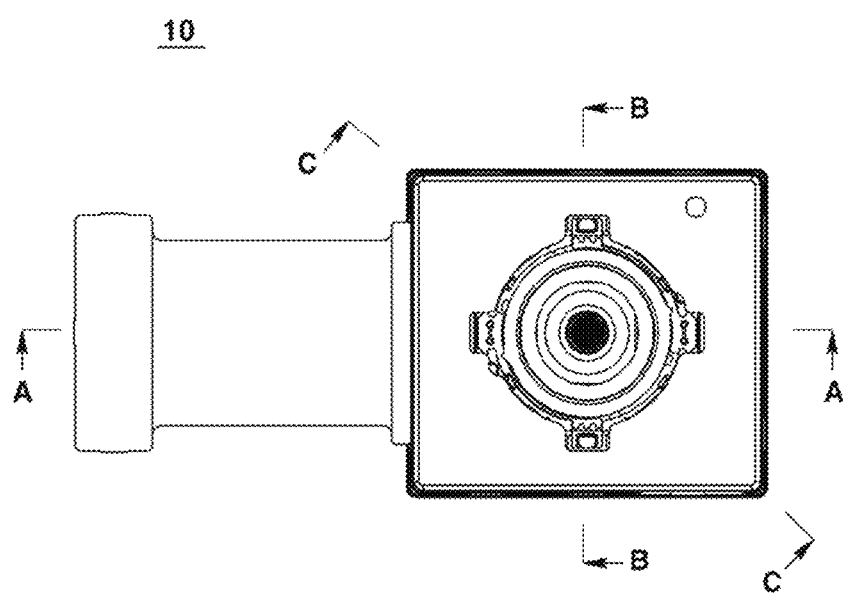

[FIG. 3]
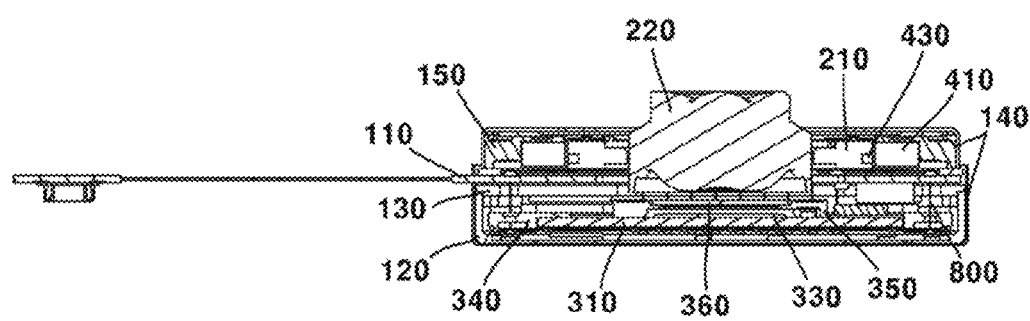
[FIG. 4]
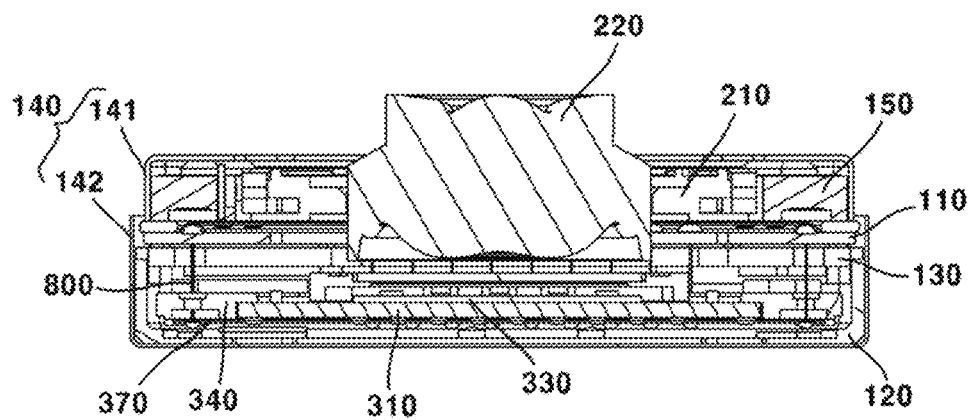

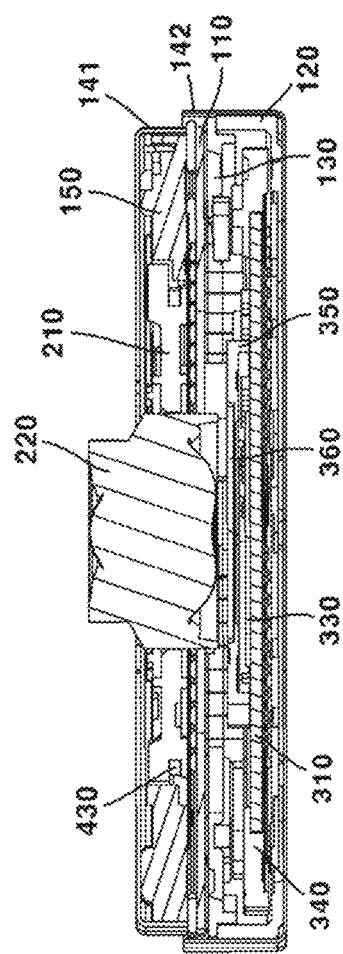
[FIG. 5]

[FIG. 6]
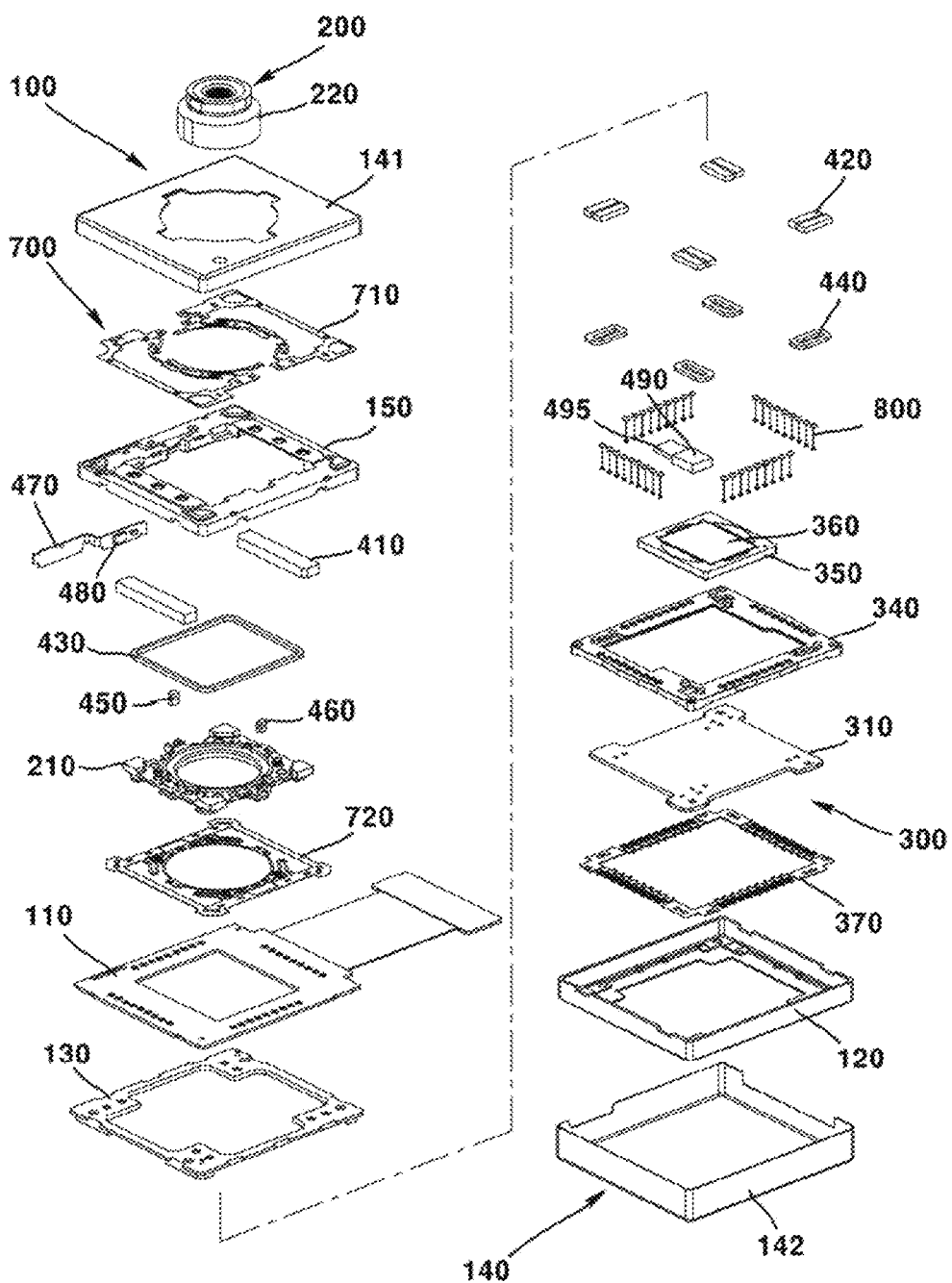

[FIG. 7]
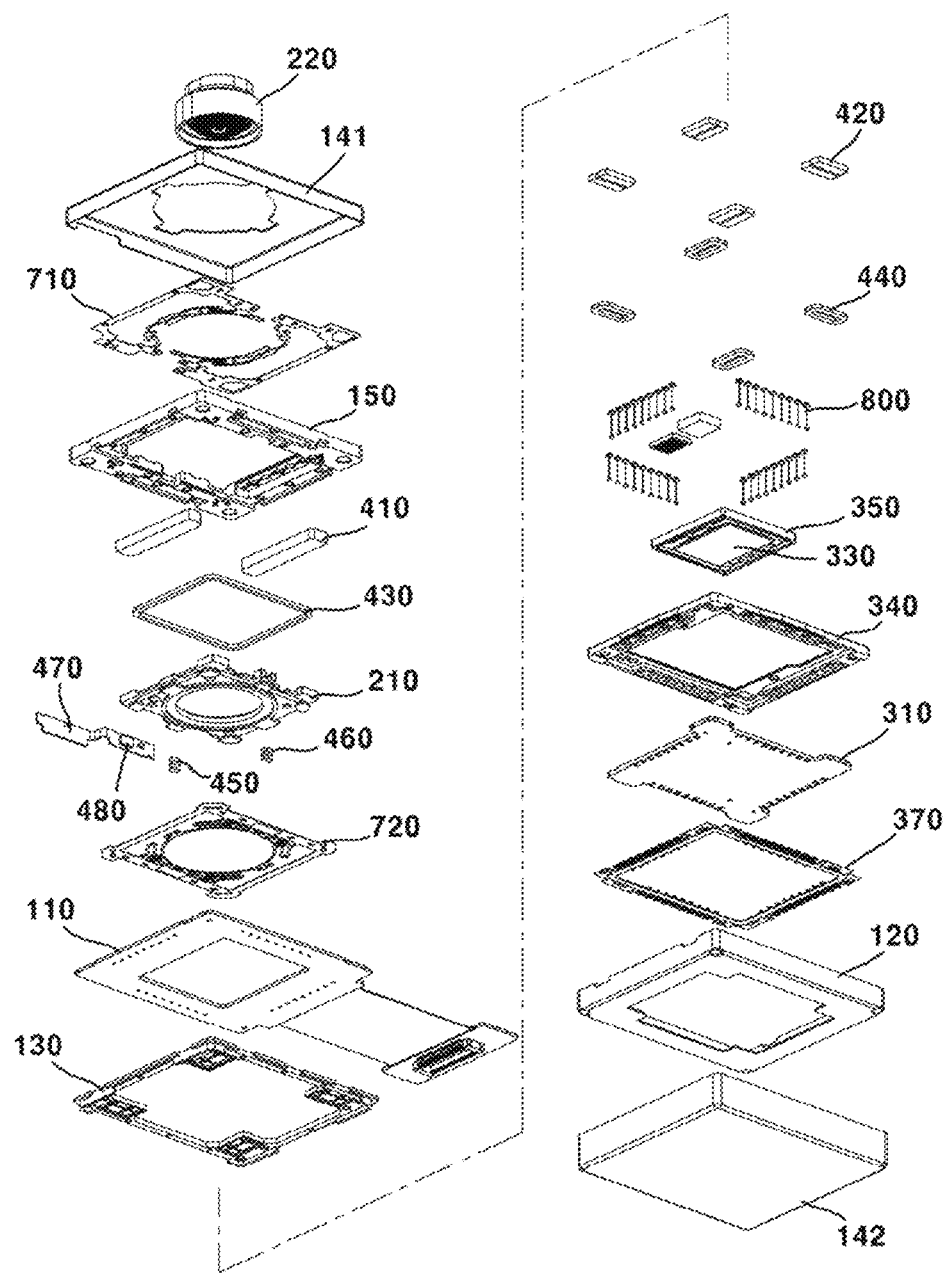

[FIG. 8]
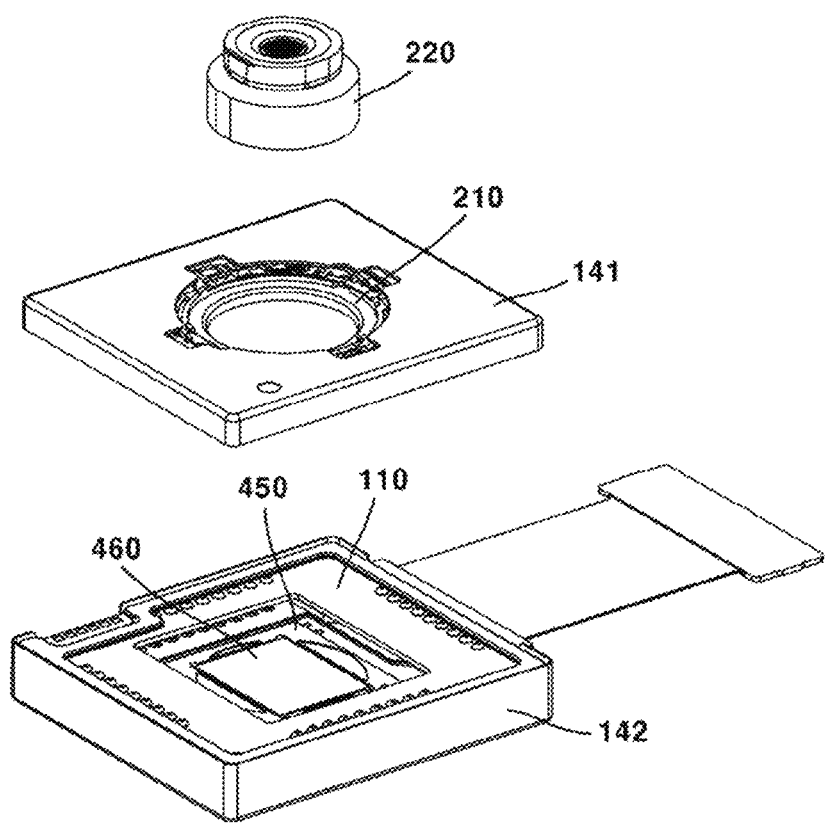

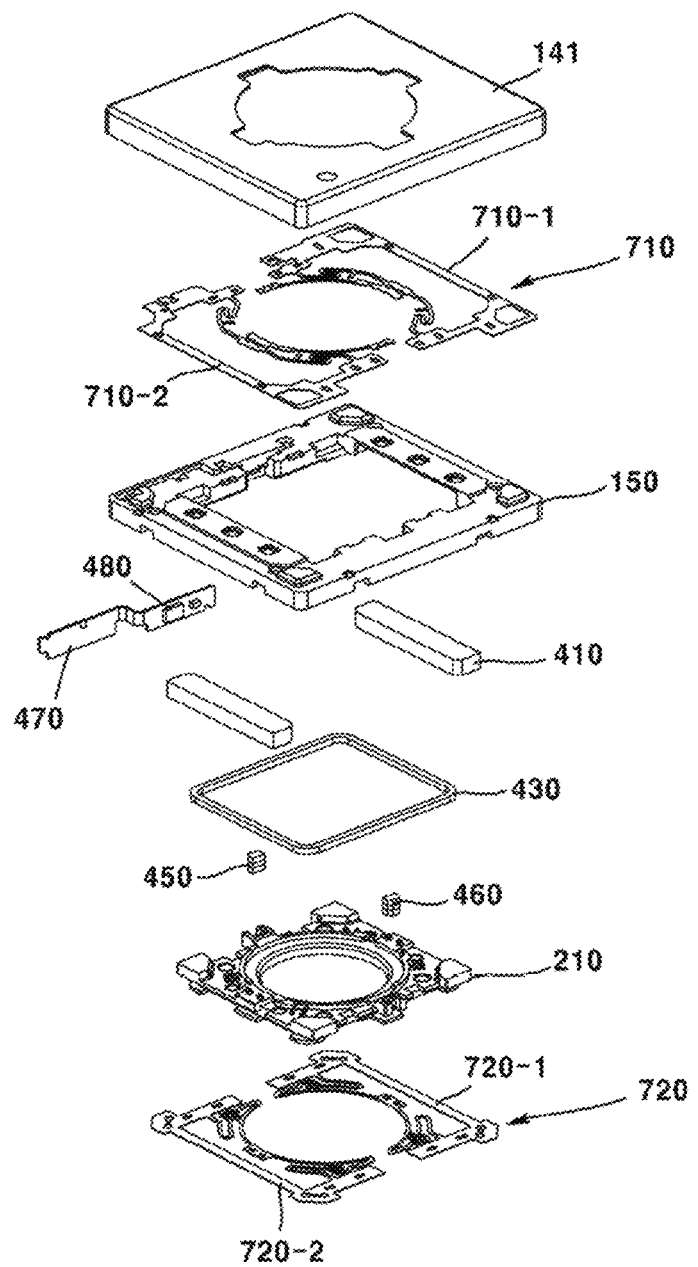
[FIG. 9]

[FIG. 10]
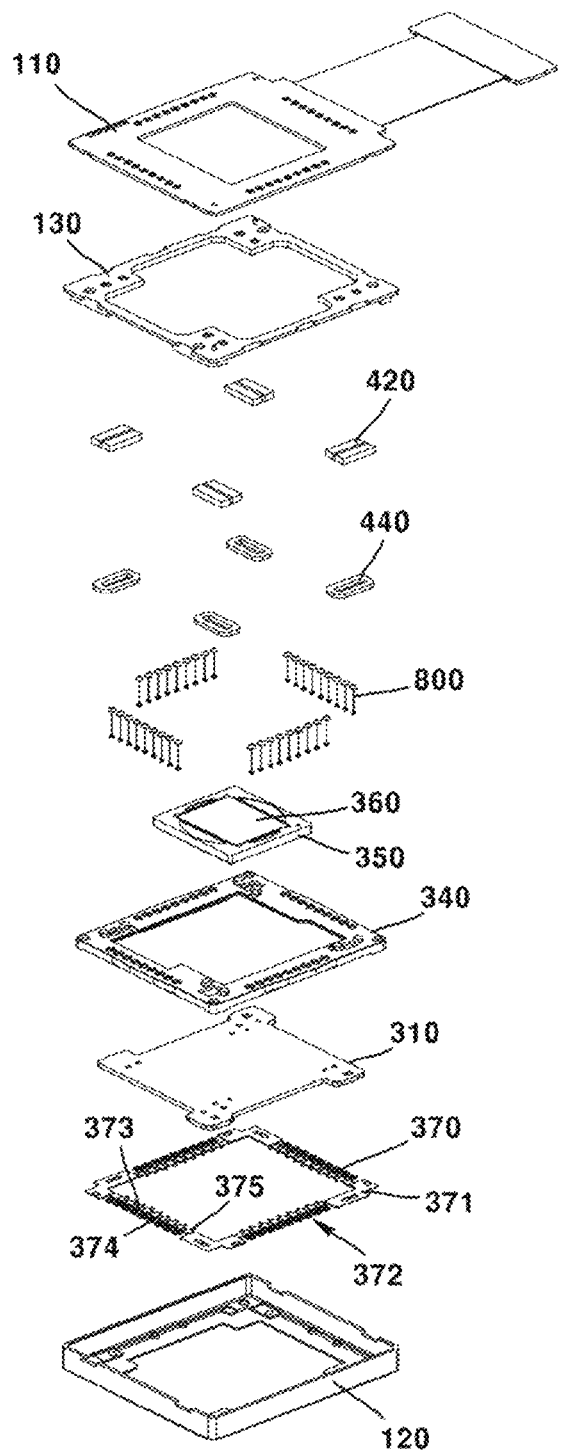

[FIG. 11]
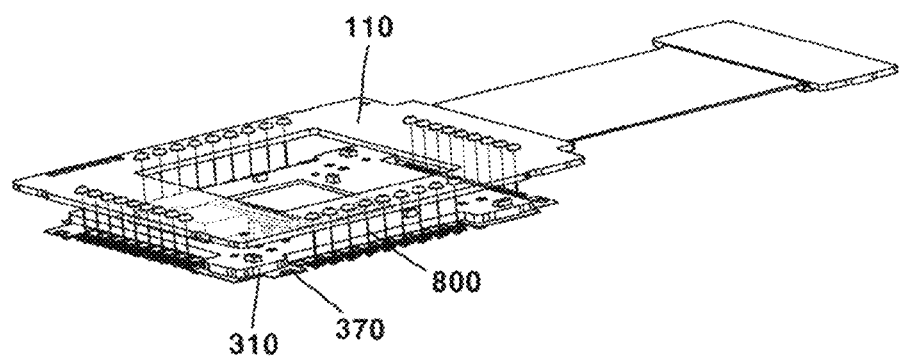
[FIG. 12]
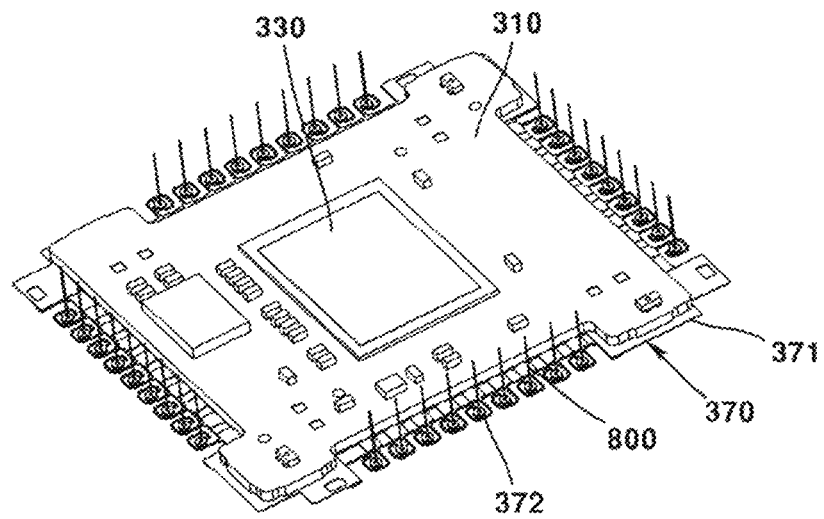

[FIG. 13]
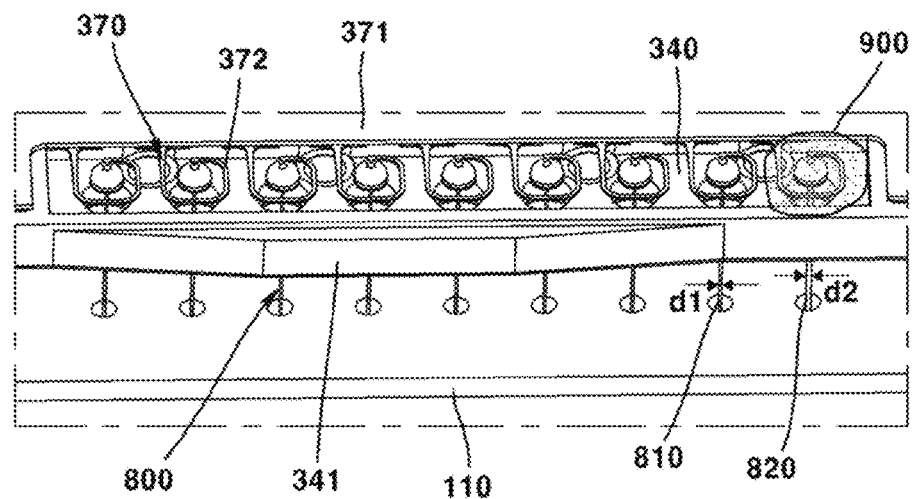
[FIG. 14]
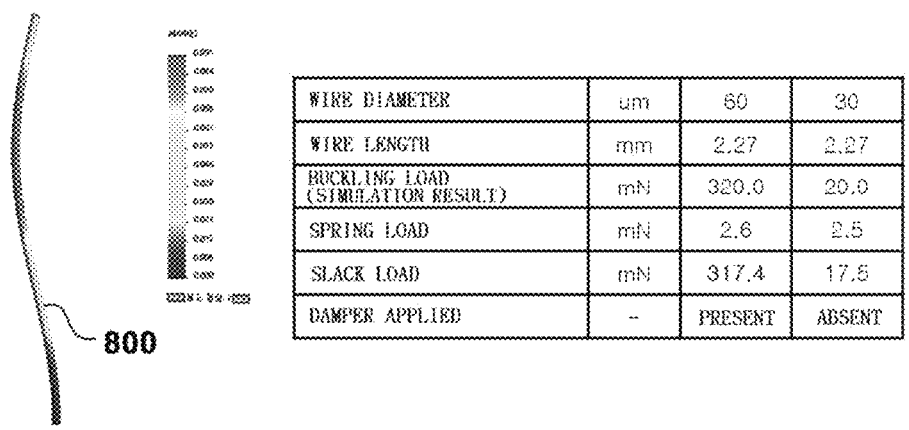
| WIRE DIAMETER | um | 60 | 30 |
| --- | --- | --- | --- |
| WIRE LENGTH | mm | 2.27 | 2.27 |
| BUCKLING LOAD (SIMULATION RESULT) | mN | 320.0 | 20.0 |
| SPRING LOAD | mN | 2.6 | 2.5 |
| SLACK LOAD | mN | 317.4 | 17.5 |
| DAMPER APPLIED | -- | PRESENT | ABSENT |

[FIG. 15]
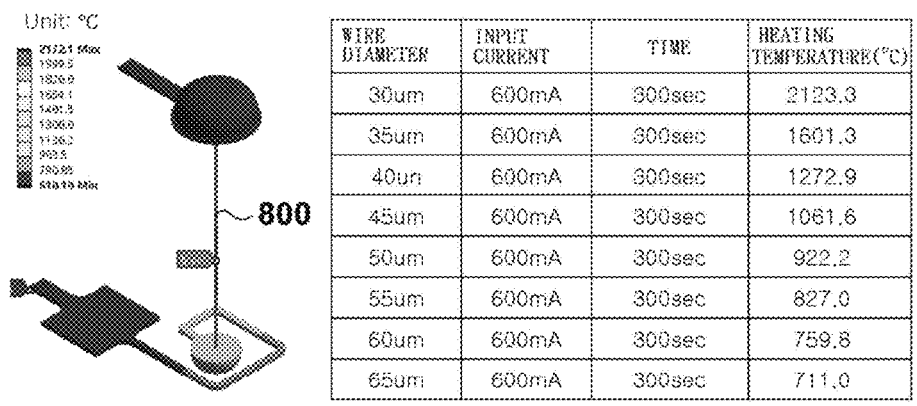
[FIG. 16]
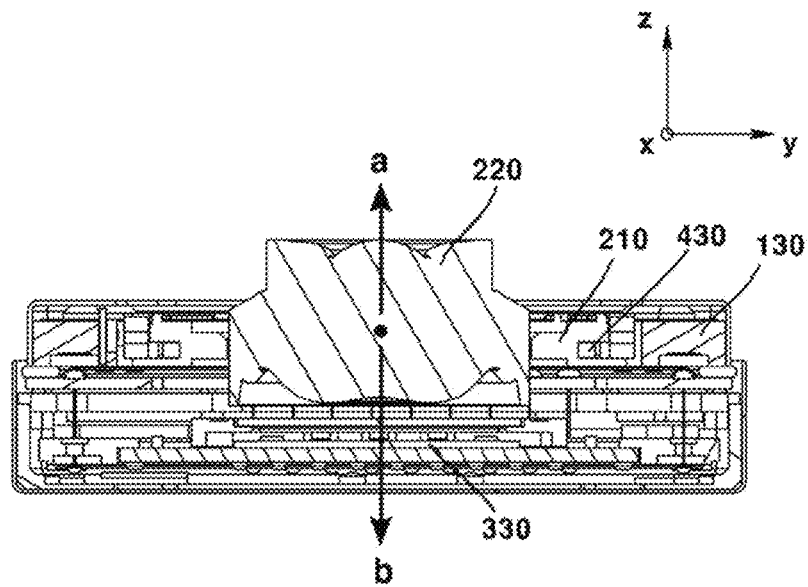

[FIG. 17]
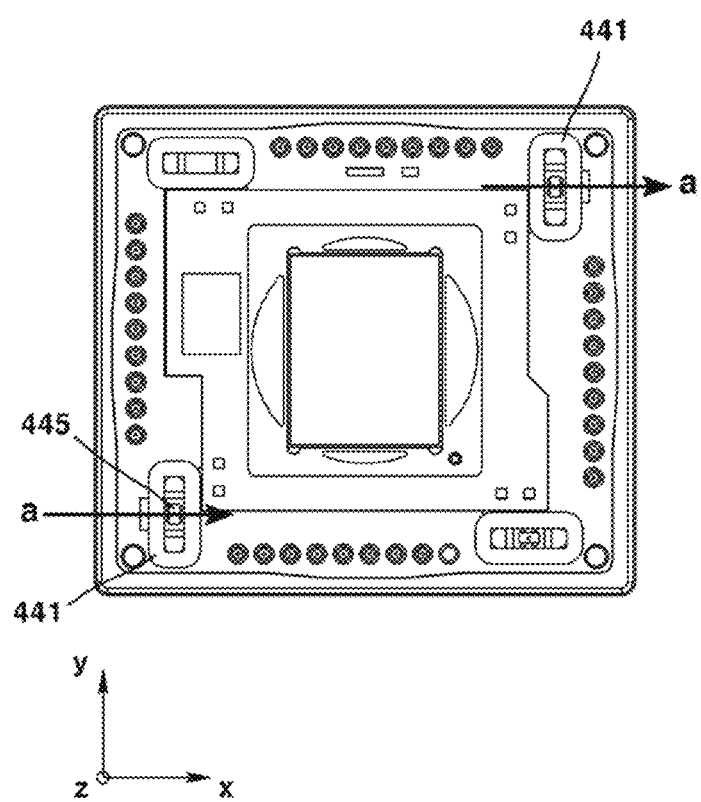

[FIG. 18]
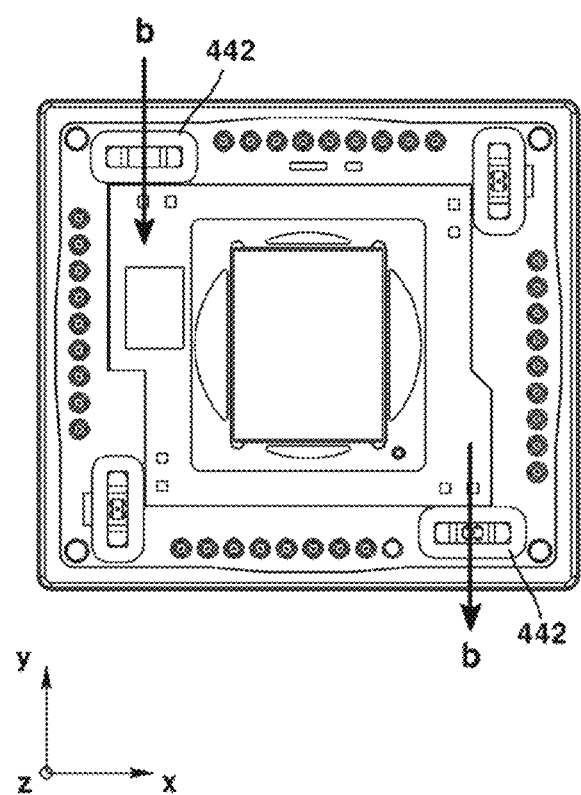

【FIG. 19】
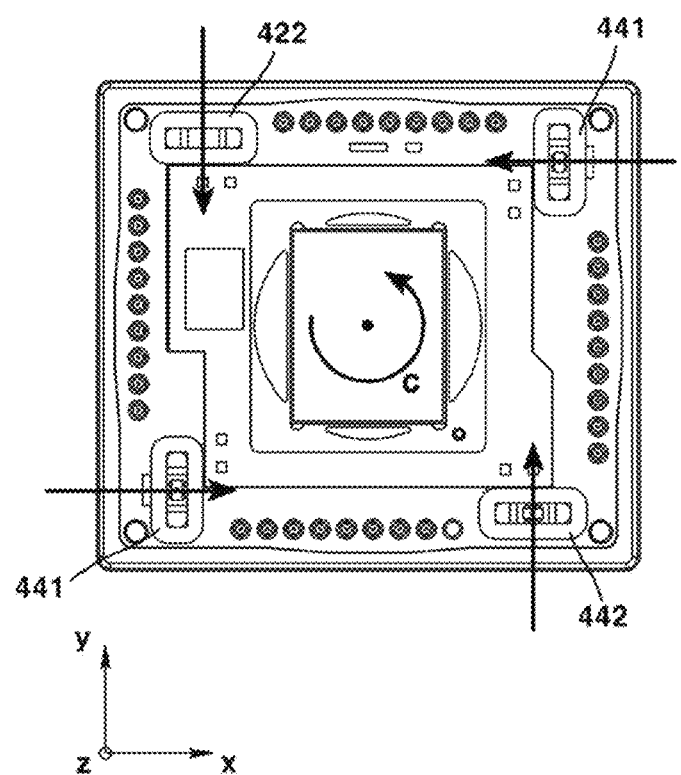

【FIG. 20】
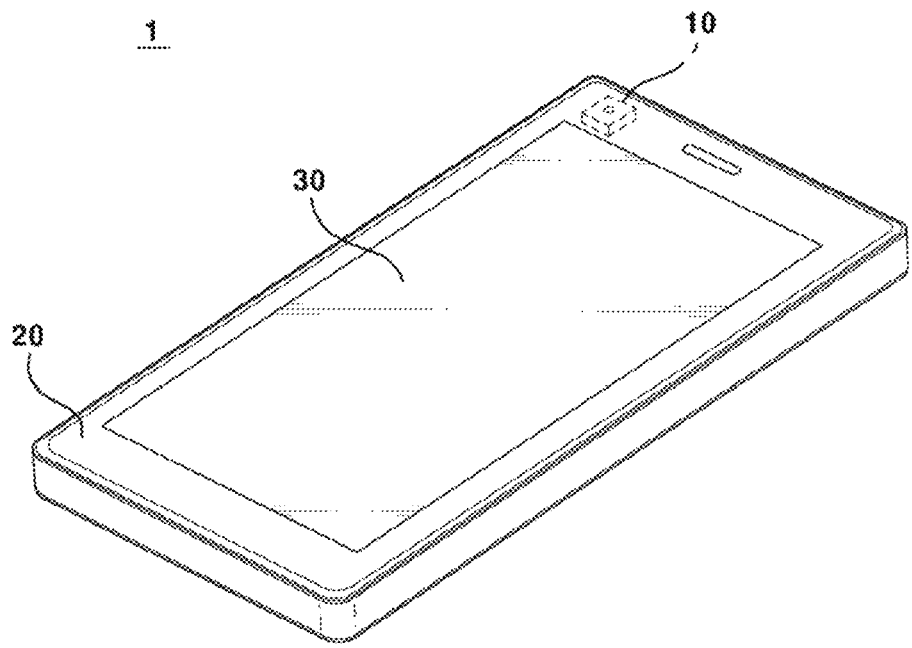
【FIG. 21】
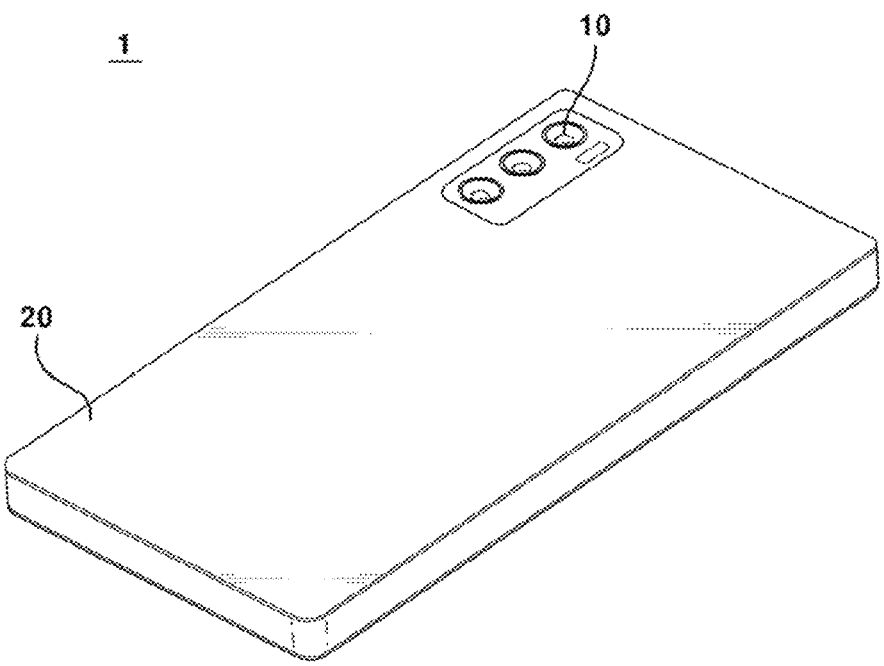

CAMERA DEVICE

CROSS REFERENCE TO RELATED APPLICATIONS

This application is the National Phase of PCT International Application No. PCT/KR2022/007202, filed on May 20, 2022, which claims priority under 35 U.S.C. 119 (a) to Patent Application No. 10-2021-0065818, filed in the Republic of Korea on May 21, 2021, all of which are hereby expressly incorporated by reference into the present application.

TECHNICAL FIELD

The present embodiments relate to a camera device.

BACKGROUND ART

A camera device is a device that takes pictures or videos of a subject, and is mounted on optical instruments such as smartphones, drones, and vehicles.

To improve image quality, camera devices require a handshaking correction function (Optical Image Stabilization, OIS) to compensate for image blur caused by user movement.

The handshaking correction (image stabilization) function in camera devices is performed by moving a lens in a direction perpendicular to the optical axis. However, due to the recent trend of high pixelation, a diameter of the lens has increased, which increases the weight of the lens, and it is difficult to secure an electromagnetic force to move the lens within a limited space.

DETAILED DESCRIPTION OF INVENTION

Technical Subject

The exemplary present embodiment aims to provide a camera device that performs an image stabilization function by moving an image sensor.

The present embodiment seeks to provide a camera device in which an image sensor is driven in three axes, namely an x-axis shift, a y-axis shift, and a z-axis roll.

Technical Solution

In one general aspect of the present invention, there may be provided a camera device, comprising: a lens; an image sensor disposed under the lens; an OIS drive unit for moving the image sensor relative to the lens in a direction perpendicular to the optical axis direction; and a plurality of wires electrically connected to the image sensor, wherein some of the plurality of wires have a larger diameter than that of the other wires.

Preferably, the camera device may comprise a damper disposed on some of the plurality of wires.

Preferably, dampers may not be disposed on the remaining wires.

Preferably, a camera device may comprise: a fixed unit comprising a first substrate; and a second movable unit comprising a second substrate, wherein the image sensor is electrically connected to the second substrate, and wherein the wire connects the first substrate and the second substrate.

Preferably, the camera device may comprise: a first movable unit disposed within the fixed unit; and an AF drive unit for moving the first movable unit in an optical axis direction relative to the fixed unit, wherein the first movable unit may comprise a lens.

Preferably, a camera device according to an exemplary embodiment of the present invention may comprise: a fixed unit; a lens disposed within the fixed unit; a second movable unit comprising an image sensor disposed below the lens; a second drive unit for moving the second movable unit in a direction perpendicular to an optical axis direction relative to the fixture; and a plurality of wires connecting the fixed unit and the second movable unit, wherein some of the plurality of wires is formed of a different thickness than that of the remaining wires.

Preferably, the camera device may comprise a first movable unit disposed within the fixed unit, the first movable unit may comprise the lens, the fixed unit may comprise a first substrate, and the wire may connect the first substrate and the second movable unit.

Preferably, the camera device may comprise a first drive unit for moving the first movable unit in an optical axial direction relative to the fixed unit.

Preferably, some of the wires may have a larger diameter than that of rest of the wires.

Preferably, the camera device may comprise a damper disposed on some of the wires.

Preferably, dampers may not be placed on the remaining wires above.

Preferably, the second movable unit may comprise a second substrate on which the image sensor is disposed, a second holder coupled to the second substrate, and a terminal member coupled to the second holder, wherein the terminal member comprises a body unit, a terminal disposed on the body unit, and wherein the terminal comprises a first portion disposed on the body unit, a second portion extending from the first portion and coupled to the wire, and a third portion extending from the first portion and coupled to the second substrate.

Preferably, the damper may connect the terminal with the wire.

Preferably, the damper may connect the wire, the terminal member, and the second holder.

Preferably, some of the wires may electrically connect the first substrate and the image sensor, and some of the wires may supply a current to the image sensor.

Preferably, the camera device may comprise a driver IC disposed on the second substrate of the second moving unit and electrically connected to the second drive unit, wherein the some wires may supply a current to the driver IC.

Preferably, the plurality of wires may comprise 36 wires, and four of the 36 wires may be formed with a larger diameter than that of the remaining wires.

Preferably, the plurality of wires may comprise 36 wires, and 8 of the 36 wires may be formed with a larger diameter than that of the remaining wires.

Preferably, each of the plurality of wires may be disposed parallel to the optical axis.

Preferably, the fixed unit may comprise a housing disposed on the first substrate, wherein the first movable unit may comprise a bobbin disposed within the housing and engaged with the lens, and the first drive unit may comprise a first coil disposed on the bobbin, and a first magnet disposed in the housing and disposed in a position corresponding to that of the first coil.

Preferably, the fixed unit may comprise a base, a first holder disposed on the base, wherein the second drive unit comprises a second magnet disposed on the first holder, and a second coil disposed on the second holder and disposed in a position corresponding to that of the second magnet.

In another general aspect of the present invention, there may be provided an optical instrument, comprising: a body; a camera device disposed on the body; and a display disposed on the body and outputting a video or image taken by the camera device.

Preferably, the camera device may comprise a fixed unit comprising a first substrate; a first movable unit comprising a lens; a second movable unit comprising an image sensor disposed below the lens; a first drive unit for moving the first movable unit in an optical axis direction with respect to the fixed unit; a second drive unit for moving the second movable unit in a direction perpendicular to the optical axis direction with respect to the fixed unit; a wire connecting the first substrate and the second movable unit; and a damper connecting the wire and the second movable unit and having a viscosity.

Preferably, the wire may comprise a plurality of wires, and the damper may be disposed on some of the plurality of wires but not disposed on remaining wires.

Preferably, some of the plurality of wires may be formed with a larger diameter than that of the remaining wires.

Preferably, some of the plurality of wires may electrically connect the first substrate to the image sensor, and some of the plurality of wires may supply a current to the image sensor.

In still another general aspect of the present invention, there may be provided a camera device, comprising: a first substrate; a second substrate spaced apart from the first substrate; an image sensor disposed on the second substrate; an OIS drive unit to move the second substrate in a direction perpendicular to an optical axis direction relative to the first substrate; a wire electrically connecting the first substrate and the second substrate; and a damper disposed on the wire, wherein the wire comprises a first wire and a second wire having a diameter greater than that of the first wire, and wherein the damper is disposed on the second wire but not on the first wire.

Preferably, the camera device may comprise a first holder disposed below the first substrate; a housing disposed above the first substrate; a bobbin disposed within the housing; and a lens coupled to the bobbin.

Preferably, the camera device may comprise an AF drive unit to move the bobbin in the optical axis direction relative to the housing.

Preferably, the AF drive unit may comprise a first magnet disposed in the housing, a first coil disposed on the bobbin and opposed to the first magnet, wherein the OIS drive unit may comprise a second magnet disposed in the first holder, a second coil disposed on the second substrate and opposed to the second magnet.

Advantageous Effects of Invention

Through the exemplary embodiments, the image sensor can be moved to perform the OIS (handshaking correction function). In this embodiment, a damper may be applied at a location with a high wire buckling load. By doing so, the wire deformation phenomenon that occurs after the impact test may be improved, that is, a reliability margin may be secured. In this embodiment, a power circuit of the image sensor or driver IC may be disposed at a location where the thick wire is applied to reduce a current heating temperature so that a relatively higher or larger current can be supplied.

BRIEF DESCRIPTION OF DRAWINGS

FIG. 1 is a perspective view of a camera device according to an exemplary embodiment of the present invention.

FIG. 2 is a top view of a camera device according to an exemplary embodiment of the present invention.

FIG. 3 is a cross-sectional view from A-A of FIG. 2.

FIG. 4 is a cross-sectional view from B-B of FIG. 2.

FIG. 5 is a cross-sectional view from C-C of FIG. 2.

FIG. 6 is an exploded perspective view of a camera device according to an exemplary embodiment of the present invention.

FIG. 7 is an exploded perspective view of a camera device according to an exemplary embodiment of the present invention from a different orientation than FIG. 6.

FIG. 8 is an exploded perspective view of an AF assembly, an OIS assembly, and a lens of a camera device according to an exemplary embodiment of the present invention.

FIG. 9 is an exploded perspective view of a first movable unit and associated configuration of a camera device according to an exemplary embodiment of the present invention.

FIG. 10 is an exploded perspective view of a second movable unit and associated configuration of a camera device according to an exemplary embodiment of the present invention.

FIG. 11 is a perspective view illustrating a first substrate, second movable unit, and wires of a camera device according to an exemplary embodiment of the present invention.

FIG. 12 is a perspective view illustrating the second movable unit and wires of a camera device according to an exemplary embodiment of the present invention.

FIG. 13 is a partially enlarged view illustrating a coupling structure of a second movable unit and a wire of a camera device according to an exemplary embodiment of the present invention.

FIG. 14 is a buckling analysis of the wire diameter of a camera device and damper application according to an exemplary embodiment of the present invention.

FIG. 15 is an illustration of current heating simulation results per diameter of wire of a camera device according to an exemplary embodiment of the present invention.

FIG. 16 is a drawing to illustrate the operation of an autofocus function of a camera device according to an exemplary embodiment of the present invention.

FIGS. 17, 18 and 19 are drawings to illustrate operation of handshaking correction function of a camera device according to an embodiment. More specifically, FIG. 17 is a drawing to illustrate an operation in which an image sensor of a camera device according to an exemplary embodiment of the present invention is shifted along an X-axis. FIG. 18 is a drawing to illustrate an operation in which an image sensor of a camera device according to an exemplary embodiment of the present invention is shifted along a y-axis. FIG. 19 is a drawing to illustrate an operation in which an image sensor of a camera device according to an exemplary embodiment of the present invention is rolled about a z-axis.

FIG. 20 is a perspective view of an optical instrument according to an exemplary embodiment of the present invention.

FIG. 21 is a perspective view of an optical instrument according to an exemplary embodiment of the present invention, from a different direction than FIG. 20.

BEST MODE

Hereinafter, exemplary embodiments of the present invention will be described in detail with reference to the accompanying drawings.

However, the present invention is not limited to the specific embodiments described, but may be implemented in a variety of different forms, and one or more of its components may be optionally combined or substituted between embodiments within the scope of the present invention.

Furthermore, terms (comprising technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention.

In this specification, the singular may comprise the plural unless the context otherwise requires, and references to "at least one (or more) of A and (or) B and C" may comprise one or more of any combination of A, B, and C that may be assembled.

In addition, the terms first, second, A, B, (a), (b), and the like may be used to describe components of embodiments of the invention. Such terms are intended only to distinguish one component from another, and are not intended to limit the nature or sequence or order of such components by such terms.

Furthermore, when a component is described as "connected," "coupled," or "attached" to another component, it can comprise cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" comprises not only when two components are in direct contact with each other, but also when one or more other components are formed or disposed between the two components. Furthermore, when expressed as "above" or "below", it may comprise the meaning of upward as well as downward with respect to a single component.

Hereinafter, a camera device according to an exemplary embodiment of the present invention will be described with reference to the accompanying drawings.

FIG. 1 is a perspective view of a camera device according to an exemplary embodiment of the present invention, FIG. 2 is a top view of a camera device according to an exemplary embodiment of the present invention, FIG. 3 is a cross-sectional view from A-A of FIG. 2, FIG. 4 is a cross-sectional view from B-B of FIG. 2, FIG. 5 is a cross-sectional view from C-C of FIG. 2, FIG. 6 is an exploded perspective view of a camera device according to an exemplary embodiment of the present invention, FIG. 7 is an exploded perspective view of a camera device according to an exemplary embodiment of the present invention from a different orientation than FIG. 6, FIG. 8 is an exploded perspective view of an AF assembly, an OIS assembly, and a lens of a camera device according to an exemplary embodiment of the present invention, FIG. 9 is an exploded perspective view of a first movable unit and associated configuration of a camera device according to an exemplary embodiment of the present invention, FIG. 10 is an exploded perspective view of a second movable unit and associated configuration of a camera device according to an exemplary embodiment of the present invention, FIG. 11 is a perspective view illustrating a first substrate, second movable unit, and wires of a camera device according to an exemplary embodiment of the present invention, FIG. 12 is a perspective view illustrating the second movable unit and wires of a camera device according to an exemplary embodiment of the present invention, and FIG. 13 is a partially enlarged view illustrating a coupling structure of a second movable unit and a wire of a camera device according to an exemplary embodiment of the present invention.

The camera device (10) may take at least one of an image and a video. The camera device (10) may be a camera. The camera device (10) may be a camera module. The camera device (10) may be a camera assembly. The camera device (10) may be a camera unit. The camera device (10) may comprise a lens drive device. The camera device (10) may comprise a sensor drive device. The camera device (10) may comprise a voice coil motor (VCM).

The camera device (10) may comprise an autofocus assembly. The camera device (10) may comprise an image stabilization assembly. The camera device (10) may comprise an autofocus unit. The camera device (10) may comprise an image stabilization device. The camera device (10) may comprise an actuator. The camera device (10) may comprise a lens-driven actuator. The camera device (10) may comprise a sensor-driven actuator. The camera device (10) may comprise an autofocus actuator. The camera device (10) may comprise an image stabilization actuator.

The camera device (10) may comprise a fixed unit (100). The fixed unit (100) may be a relatively fixed portion of the movable units (200, 300) as they move. The fixed unit (100) may be a relatively fixed portion when at least one of the first movable unit (200) and the second movable unit (300) is moved. The fixed unit (100) may accommodate the first movable unit (200) and the second movable unit (300). The fixed unit (100) may be disposed on an outer side of the first movable uni (200) and the second movable unit (300). The camera device (10) may comprise a first substrate (110). The fixed unit (100) may comprise the first substrate (110). The first substrate (110) may be a main board. The first substrate (110) may be a substrate. The first substrate (110) may be a printed circuit board (PCB). The first substrate (110) may be connected to a power source of the optical instrument (1). The first substrate (110) may comprise a connector connected to a power source of the optical instrument (1).

The first substrate (110) may be disposed on top of a base (120). The first substrate (110) may be disposed on top of a first holder (130). The first substrate (110) may be disposed below a housing (150). The first substrate (110) may be disposed between the first holder (130) and the housing (150).

Throughout the specification, although the first substrate (110) has been described as a component of the fixed unit (100), the first substrate (110) may also be understood as a separate configuration from the fixed unit (100).

The camera device 10 may comprise a base (120). The fixed unit (100) may comprise a base (120). The base (120) may be disposed below a first holder (130). The base (120) may be secured to the first holder (130). The base (120) may be coupled to the first holder (130). The base (120) may be disposed below the first substrate (110). The base (120) may be secured to the first substrate (110). The base (120) may be coupled to the first substrate (110)

The camera device (10) may comprise a first holder (130). The fixed unit (100) may comprise a first holder (130). The first holder (130) may be disposed on the base (120). The first holder (130) may be disposed on the base (120). The first holder (130) may be disposed on top of the base (120). The first holder (130) may be secured to the base (120). The first holder (130) may be coupled to the base (120). The first holder (130) may be adhesively bonded to the base (120) by an adhesive. The first holder (130) may be disposed underneath the first substrate (110). The first holder (130) may be disposed between the first substrate (110) and the base (120). The first holder (130) may be formed as a separate member from the base (120).

The camera device (10) may comprise a cover member (140). The fixed unit (100) may comprise the cover member (140). The cover member (140) may be coupled to the base (120). The cover member (140) may be coupled to the first holder (130). The cover member (140) may be coupled to the housing (150). The cover member (140) may be secured to the base (120). The cover member (140) may be secured to the first holder (130). The cover member (140) may be secured to the housing (150). The cover member (140) may cover at least a portion of the base (120). The cover member (140) may cover at least a portion of the first holder (130). The cover member (140) may cover at least a portion of the housing (150).

The cover member (140) may be a "cover can" or "shield can". The cover member (140) may be formed of a metal material. The cover member (140) may block electromagnetic interference (EMI). The cover member (140) may be electrically connected to the first substrate (110). The cover member (140) may be grounded to the first substrate (110).

The cover member (140) may comprise a top cover member (141). The top cover member (141) may be disposed on top of the first substrate (110). The top cover member (141) may cover the housing (150). The top cover member (141) may form an exterior of the autofocus assembly.

The cover member (140) may comprise a lower cover member (142). The lower cover member (142) may be disposed underneath the first substrate (110). The lower cover member (142) may cover the base (120). The lower cover member (142) may form an exterior of the image stabilization assembly.

The camera device (10) may comprise a housing (150). The fixed unit (100) may comprise the housing (150). The housing (150) may be disposed on the first substrate (110). The housing (150) may be disposed on top of the first substrate (110). The housing (150) may be disposed on the first substrate (110). The housing (150) may be disposed on a top surface of the first substrate (110). The housing (150) may be secured to the first substrate (110). The housing (150) may be coupled to the first substrate (110). The housing (150) may be disposed on an outer side of a bobbin (210). The housing (150) may comprise a hole in which the bobbin (210) is disposed. The housing (150) may comprise a groove in which a first magnet (410) is disposed.

The camera device (10) may comprise a first movable unit (200). The first movable unit (200) may be movable relative to the fixed unit (100). The first movable unit (200) may move in an optical axis direction relative to the fixed unit (100). The first movable unit (200) may be disposed within the fixed unit (100). The first movable unit (200) may be movably disposed within the fixed unit (100). The first movable unit (200) may be movably disposed in the fixed unit (100) in an optical axis direction. An autofocus (AF) function may be performed by moving the first movable unit (200) in an optical axial direction with respect to the fixed unit (100). The first movable unit (200) may be disposed on the second movable unit (300)

The camera device (10) may comprise a bobbin (210). The first movable unit (200) may comprise the bobbin (210). The bobbin (210) may be disposed on top of the first substrate (110). The bobbin (210) may be spaced apart on the first substrate (110). The bobbin (210) may be disposed within the housing (150). The bobbin (210) may be disposed on an inner side of the housing (150). At least a portion of the bobbin (210) may be housed in the housing (150). The bobbin (210) may be movably disposed in the housing (150). The bobbin (210) may be movably disposed in the housing (150) in the optical axis direction. The bobbin (210) may be coupled to a lens (220). The bobbin (210) may comprise a hollow or hole. The lens (220) may be disposed in the hollow or hole of the bobbin (210). An inner circumferential surface of the bobbin (210) may be coupled to an outer circumferential surface of the lens (220).

The camera device (10) may comprise a lens (220). The first movable unit (200) may comprise the lens (220). The lens (220) may be coupled to the bobbin (210). The lens (220) may be secured to the bobbin (210). The lens (220) may be integrally movable with the bobbin (210). The lens (220) may be threadedly coupled to the bobbin (210). The lens (220) may be adhesively bonded to the bobbin (210) by an adhesive. The lens (220) may be disposed in a position corresponding to that of an image sensor (330). An optical axis of the lens (220) may be aligned with an optical axis of the image sensor (330). The optical axis may be the z-axis. The lens (220) may comprise a plurality of lenses. The lens (220) may comprise five or six lenses.

The camera device (10) may comprise a lens module. The lens module may be coupled to a bobbin (210). The lens module may comprise a barrel, and one or more lenses (220) disposed within the barrel.

The camera device (10) may comprise a second movable unit (300). The second movable unit (300) may be movable relative to the fixed unit (100). The second movable unit (300) may move in a direction perpendicular to the optical axis direction relative to the fixed unit (100). The second movable unit (300) may be disposed within the fixed unit (100). The second movable unit (300) may be movably disposed within the fixed unit (100). The second movable unit (300) may be movably disposed within the fixed unit (100) in a direction perpendicular to the optical axis direction. By moving the second movable unit (300) in a direction perpendicular to the optical axis direction with respect to the fixed unit (100), an image stabilization (OIS) function may be performed. The second movable unit (300) may be disposed between the first movable unit (200) and the base (120). The second movable unit (300) may be disposed below the first movable unit (200).

The camera device (10) may comprise a second substrate (310). The second movable unit (300) may comprise a second substrate (310). The second substrate (310) may be a substrate. The second substrate (310) may be a printed circuit board (PCB). The second substrate (310) may be disposed between the first movable unit (200) and the base (120). The second substrate (310) may be disposed between the bobbin (210) and the base (120). The second substrate (310) may be disposed between the lens (220) and the base (120). The second substrate (310) may be spaced apart from the fixed unit (100). The second substrate (310) may be spaced apart from the fixed unit (100) in an optical axis direction and a direction perpendicular to the optical axis direction. The second substrate (310) may be movable in a direction perpendicular to the optical axis direction. An image sensor (330) may be disposed on the second substrate (310). The image sensor (330) may be mounted on the second substrate (310). The second substrate (310) may be mounted with the image sensor (330). The image sensor (330) may be coupled to the second substrate (310) by wire bonding. The second substrate (310) may be electrically connected to the image sensor (330). The second substrate (310) may be integrally movable with the image sensor (330).

The camera device (10) may comprise an image sensor (330). The second movable unit (300) may comprise an image sensor (330). The image sensor (330) may be disposed on the second substrate (310). The image sensor (330) may be disposed between the second substrate (310) and the sensor base (350). The image sensor (330) may be electrically connected to the second substrate (310). The image sensor (330) may be integrally movable with the second substrate (310). The image sensor (330) may be disposed below the lens (220). The image sensor (330) may be disposed in a position corresponding to that of the lens (220).

The image sensor (330) may be formed with an image by allowing a light that has passed through a lens (220) and a filter (360) to be incident. The image sensor (330) may be electrically connected to the second substrate (310) and the first substrate (110). The image sensor (330) may comprise an active image area. The image sensor (330) can convert a light illuminating the active image area into an electrical signal. The image sensor (330) may comprise one or more of a charge coupled device (CCD), a metal oxide semiconductor (MOS), a CPD, and a CID.

The camera device (10) may comprise a second holder (340). The second movable unit (300) may comprise the second holder (340). The second holder (340) may be formed of an insulating material. The second holder (340) may be disposed on the second substrate (310). The second holder (340) may be disposed on the second substrate (310). The second holder (340) may be disposed on top of the second substrate (310). The second holder (340) may be secured to the second substrate (310). The second holder (340) may be coupled to the second substrate (310). The second holder (340) may comprise a hollow or hole in which the image sensor (330) is disposed. A second coil (440) may be disposed in the second holder (340). The second holder (340) may comprise a protrusion around which the second coil (440) is wound. The second holder (340) may comprise a hole in which the Hall sensor (445) is disposed.

The second holder (340) may comprise a lateral stopper (341). The lateral stopper (341) can contact the fixed unit (100) when the second holder (340) is moved laterally. This can limit movement of the second holder (340). The lateral stopper (341) may also limit the rotation of the second holder (340) to within a predetermined angle. The lateral stopper (341) may protrude from an outer surface of the second holder (340). The lateral stopper (341) may comprise a sloped surface.

The camera device (10) may comprise a sensor base (350). The second movable unit (300) may comprise the sensor base (350). The sensor base (350) may be disposed on the second substrate (310). The sensor base (350) may comprise a hole formed in a position corresponding to that of the image sensor (330). The sensor base (350) may comprise a groove in which a filter (360) is disposed.

The camera device (10) may comprise a filter (360). The second movable unit (300) may comprise the filter (360). The filter (360) may be disposed between the lens (220) and the image sensor (330). The filter (360) may be disposed on the sensor base (350). The filter (360) can block certain frequency bands of light from entering the image sensor (330) from light that has passed through the lens (220). The filter (360) may comprise an infrared cutoff filter. The filter (360) can block infrared light from entering the image sensor (330).

The camera device (10) may comprise a terminal member (370). The terminal member (370) may be an interposer. The terminal member (370) may connect a wire (800) and a second substrate (310). The terminal member (370) may electrically connect the wire (800) and the second substrate (310). The terminal member (370) may comprise a body unit (371). The body unit (371) may be formed of an insulating material. The body unit (371) may be an insulating unit. The body unit (371) may be an insulator. However, the body unit 371 may comprise conductive region. The body unit (371) may be disposed on the second holder (340).

The terminal member (370) may comprise a terminal (372). The terminal (372) may be disposed on the body unit (371). The terminal (372) may be formed of a metal. The terminal (372) may be formed of a conductive member. The terminal (372) may have elasticity in at least a portion thereof.

The terminal (372) may comprise a first portion (373). The first portion (373) may be disposed on the body unit (371). The terminal (372) may comprise a second portion (374). The second portion (374) may extend to one side from the first portion (373). The second portion (374) may be coupled to a wire (800). The second portion (374) may comprise a bent portion. The second portion (374) may be elastic. The terminal (372) may comprise a third portion (375). The third portion (375) may extend to the other side from the first portion (373). The third portion (375) may be coupled to the second substrate (310).

The camera device (10) may comprise a drive unit. The drive unit may move the movable units (200, 300) relative to the fixed unit (100). The drive unit may perform an autofocus (AF) function. The drive unit may perform an image stabilization (OIS) function. The drive unit may move the lens 220. The drive unit may move the image sensor 330. The drive unit may comprise magnets and coils. The drive unit may comprise a shape memory alloy (SMA).

The camera device (10) may comprise a first drive unit. The first drive unit may be an AF drive unit. The first drive unit may move the first movable unit (200) in the optical axis direction. The first drive unit may move the bobbin (210) in the optical axis direction. The first drive unit may move the lens (220) in the optical axis direction. The first drive unit may perform an autofocus (AF) function. The first drive unit may move the first movable unit (200) in an upward direction of the optical axis direction. The first drive unit may move the first movable unit (200) in the downward direction of the optical axis direction. The first drive unit may comprise a first magnet (410). The first drive unit may comprise a first coil (430). The first drive unit may move the first movable unit (200) in an optical axial direction relative to the fixed unit (100).

The camera device (10) may comprise a second drive unit. The second drive unit may be an OIS drive unit. The second drive unit may move the second movable unit (300) in a direction perpendicular to the optical axis direction. The second drive unit may move the second substrate (310) in a direction perpendicular to the optical axis direction. The second drive unit may move the image sensor (330) in a direction perpendicular to the optical axis direction. The second drive unit can move the second holder (340) in a direction perpendicular to the optical axis direction. The second drive unit can move the sensor base (350) in a direction perpendicular to the optical axis direction. The second drive unit may move a filter (360) in a direction perpendicular to the optical axis direction. The second drive unit may perform the image stabilization (OIS) function. The second drive unit may comprise a second magnet (420). The second drive unit may comprise a second coil (440). The second drive unit may move the second movable unit (300) in a direction perpendicular to the optical axis direction relative to the fixed unit (100)

The second drive unit may move the second movable unit (300) in a first direction perpendicular to the optical axis direction. The second drive unit may move the second movable unit (300) in a second direction perpendicular to the optical axis direction and the first direction. The second drive unit may rotate the second movable unit (300) about the optical axis. The camera device (10) may comprise a first magnet (410). The drive unit may comprise the first magnet (410). The first magnet (410) may be an AF magnet. The first magnet (410) may be used for AF drive. The first magnet (410) may be a magnet. The first magnet (410) may be a permanent magnet.

The first magnet (410) may be disposed on the fixed unit (100). The first magnet (410) may be secured to the fixed unit (100). The first magnet (410) may be coupled to the fixed unit (100). The first magnet (410) may be bonded to the fixed unit (100) using an adhesive. The first magnet (410) may be disposed in the housing (150). The first magnet (410) may be secured to the housing (150). The first magnet (410) may be coupled to the housing (150). The first magnet (410) may be bonded to the housing (150) using an adhesive. The first magnet (410) may be disposed in the housing (150) in a position corresponding to that of the first coil (430).

The first magnet (410) may be a two-pole magnetizing magnet comprising one N-pole region and one S-pole region. In a modification, the first magnet (410) may be a four-pole magnetizing magnet comprising two N-pole regions and two S-pole regions.

The first magnet (410) may comprise a plurality of magnets. The first magnet (410) may comprise two magnets. The two first magnets (410) may be disposed among four second magnets (420). The first magnet (410) may comprise first and second unit magnets. The first and second unit magnets may be disposed symmetrically about the optical axis. The first and second unit magnets may be mutually formed of the same size and shape.

The camera device (10) may comprise a second magnet (420). The drive unit may comprise the second magnet (420). The second magnet (420) may be an OIS magnet (420). The second magnet (420) may be used for OIS driving. The second magnet (420) may be a magnet. The second magnet (420) may be a permanent magnet.

The second magnet (420) may be disposed on the fixed unit (100). The second magnet (420) may be secured to the fixed unit (100). The second magnet (420) may be coupled to the fixed unit (100). The second magnet (420) may be bonded to the fixed unit (100) using an adhesive. The second magnet (420) may be disposed on the first holder (130). The second magnet (420) may be secured to the first holder (130). The second magnet (420) may be coupled to the first holder (130). The second magnet (420) may be bonded to the first holder 130 using an adhesive. The second magnet (420) may be disposed at a corner of the first holder (130). The second magnet (420) may be disposed biased toward a corner of the first holder (130).

The second magnet (420) can be a four-pole magnetizing magnet comprising two N-pole regions and two S-pole regions. In a modification, the second magnet (420) may be a two-pole magnetizing magnet comprising one N-pole region and one S-pole region.

The second magnet (420) may comprise a plurality of magnets. The second magnet (420) may comprise four magnets. The four second magnets (420) may be disposed in each of the four corner regions of the fixed unit (100). The second magnet (420) may comprise one to four unit magnets. The first to fourth unit magnets may be disposed symmetrically about the optical axis. The first to fourth unit magnets may be mutually formed of the same size and shape.

In the exemplary embodiment, the first magnet (410) and the second magnet (420) may be formed with different sizes. The first magnet (410) may be formed separately from the second magnet (420). The first magnet (410) may be spaced apart from the second magnet (420). In the optical axis direction, the thickness of the second magnet (420) may be thinner than the thickness of the first magnet (410). A length of the long axis of the first magnet (410) may be greater than a length of the long axis of the second magnet (420).

In a modification, the first magnet (410) and the second magnet (420) may be disposed on the movable units (200, 300) and the first coil (430) and the second coil (440) may be disposed on the fixed unit (100).

The camera device (10) may comprise a first coil (430). The drive unit may comprise the first coil (430). The first coil (430) may be an AF coil. The first coil (430) may be used for AF drive. The first coil (430) may be disposed in the first movable unit (200). The first coil (430) may be fixed to the first movable unit (200). The first coil (430) may be coupled to the first movable unit (200). The first coil (430) may be bonded to the first movable unit (200) using an adhesive. The first coil (430) may be disposed on the bobbin (210). The first coil (430) may be secured to the bobbin (210). The first coil (430) may be coupled to the bobbin (210). The first coil (430) may be bonded to the bobbin (210) using an adhesive. The first coil (430) may be disposed around a peripheral surface of the bobbin (210). The first coil (430) may be electrically connected to a driver IC (480). The first coil (430) may be electrically connected to a lower elastic member (720), a sensing board (470), and a driver IC (480). The first coil (430) may be supplied with a current from the driver IC (480).

The first coil (430) may be disposed in a position corresponding to that of the first magnet (410). The first coil (430) may be disposed on the bobbin (210) in a position corresponding to that of the first magnet (410). The first coil (430) may be disposed in a position corresponding to that of the first magnet 410 on the first movable unit (200). The first coil (430) may face the first magnet (410). The first coil (430) may comprise a surface facing the first magnet (410). The first coil (430) may be disposed adjacent to the first magnet (410). The first coil (430) may interact with the first magnet (410). The first coil (430) may electromagnetically interact with the first magnet (410).

The first coil (430) may move the first movable unit (200) in an optical axis direction. The first coil (430) may move the bobbin (210) to an optical axis direction. The first coil (430) may move the lens (220) in the optical axis direction. The first coil (430) may move the first movable unit (200) in an upward direction of the optical axis direction. The first coil (430) may move the bobbin (210) in an upward direction of the optical axis direction. The first coil (430) can move the lens (220) in the upward direction of the optical axis direction. The first coil (430) can move the first moveable unit (200) in a downward direction of the optical axis direction. The first coil (430) can move the bobbin (210) in a downward direction of the optical axis direction. The first coil (430) can move the lens (220) in a downward direction of the optical axis direction. The first coil (430) can move the first movable unit (200) in the optical axis direction through interaction with the first magnet (410).

The camera device (10) may comprise a second coil (440). The drive unit may comprise the second coil (440). The second coil (440) may be disposed on the second movable unit (300). The second coil (440) may be secured to the second movable unit (300). The second coil (440) may be coupled to the second movable unit (300). The second coil (440) may be adhesively bonded to the second movable unit (300) using an adhesive. The second coil (440) may be disposed on the second holder (340). The second coil (440) may be secured to the second holder (340). The second coil (440) may be coupled to the second holder (340). The second coil (440) may be bonded to the second holder (340) using an adhesive. The second coil (440) may be disposed by being wound around a projection of the second holder (340). The second coil (440) may be disposed on the second holder (340). The second coil (440) may be electrically connected to the second substrate (310). Both ends of the second coil (440) may be soldered to the second substrate (310). The second coil (440) may be solderably coupled to the second substrate (310) using a solder. The second coil (440) may be electrically connected to the driver IC (495). The second coil (440) may be electrically connected to the second substrate (310) and the driver IC (495). The second coil (440) may receive a current from the driver IC (495).

The second coil (440) may be disposed in a position corresponding to that of the second magnet (420). The second coil (440) may be disposed in the second holder (340) in a position corresponding to that of the second magnet (420). The second coil (440) may be disposed in a position corresponding to that of the second magnet (420) on the second movable unit (300). The second coil (440) may face the second magnet (420). The second coil (440) may comprise a surface facing the second magnet (420). The second coil (440) may be disposed adjacent to the second magnet (420). The second coil (440) may interact with the second magnet (420). The second coil (440) may electromagnetically interact with the second magnet (420).

The second coil (440) can move the second movable unit (300) in a direction perpendicular to the optical axis direction. The second coil (440) can move the second substrate (310) in a direction perpendicular to the optical axis direction. The second coil (440) can move the image sensor (330) in a direction perpendicular to the optical axis direction. The second coil (440) can move the second holder (340) in a direction perpendicular to the optical axis direction. The second coil (440) can rotate the second movable unit (300) about the optical axis. The second coil (440) can rotate the second substrate (310) about the optical axis. The second coil (440) can rotate the image sensor (330) about the optical axis. The second coil (440) can rotate the second holder (340) about the optical axis. The second coil (440) may move the second movable unit (300) to a direction perpendicular to the optical axis direction through interaction with the second magnet (420) and rotate same about the optical axis.

The second coil (440) may comprise a plurality of coils. The second coil (440) may comprise four coils. The second coil (440) may comprise a coil for an x-axis shift. The second coil (440) may comprise a coil for y-axis shift.

The second coil (440) may comprise a second-1 coil (441). The second-1 coil (441) may be a first unit coil. The second-1 coil (441) may be a first sub coil. The second-1 coil (441) may be a coil for an x-axis shift. The second-1 coil (441) may move the second movable unit (300) in the x-axis direction. The second-1 coil (441) may be lengthily disposed in the y-axis. The second-1 coil (441) may comprise a plurality of coils. The second-1 coil (441) may comprise two coils. The two coils of the second-1 coil (441) may be electrically connected to each other. The second-1 coil (441) may comprise a connecting coil connecting two coils. In this case, the two coils of the second-1 coil (441) can be applied a current together. Alternatively, the two coils of the second-1 coil (441) may individually receive a current by being electrically isolated from each other.

The second coil (440) may comprise a second-2 coil (442). The second-2 coil (442) may be a second unit coil. The second-2 coil (442) may be a second sub coil. The second-2 coil (442) may be a coil for a y-axis shift. The second-2 coil (442) may move the second movable unit (300) in the y-axis direction. The second-2 coil (442) may be lengthily disposed in the x-axis. The second-1 coil (441) may comprise a plurality of coils. The second-2 coil (442) may comprise two coils. The two coils of the second-2 coil (442) may be electrically connected to each other. The second-2 coil (442) may comprise a connecting coil connecting the two coils. In this case, the two coils of the second-2 coil (442) may be applied with a current together. Alternatively, the two coils of the second-2 coil (442) may be individually applied with a current by being electrically and mutually isolated from each other.

The camera device (10) may comprise a Hall sensor (445). The Hall sensor (445) may be disposed on the second substrate (310). The Hall sensor (445) may be disposed in a hole in the second holder (340). The Hall sensor (445) may comprise a Hall IC. The Hall sensor (445) can sense the second magnet (420). The Hall sensor (445) can detect a magnetic force on the second magnet (420). The Hall sensor (445) may face the second magnet (420). The Hall sensor (445) may be disposed at a position corresponding to that of the second magnet (420). The Hall sensor (445) may be disposed adjacent to the second magnet (420). The Hall sensor (445) may detect the position of the second movable unit (300). The Hall sensor (445) may detect movement of the second movable unit (300). The Hall sensor (445) may be disposed in a hollow of the second coil (440). The sensed value detected by the Hall sensor (445) may be used to feedback the image stabilization drive. The Hall sensor (445) may be electrically connected to driver IC (495).

The Hall sensor (445) may comprise a plurality of Hall sensors. The Hall sensor (445) may comprise three Hall sensors. The Hall sensor (445) may comprise a first to a third Hall sensor. The first Hall sensor can detect a displacement of the second movable unit (300) in the x-axis direction. The second Hall sensor can detect displacement of the second movable unit (300) in the y-axis direction. The third Hall sensor may detect a rotation of the second movable unit (300) about the z-axis, either alone or in combination with one or more of the first and second Hall sensors.

The camera device (10) may comprise a sensing magnet (450). The sensing magnet (450) may be disposed on the first movable unit (200). The sensing magnet (450) may be fixed to the first movable unit (200). The sensing magnet (450) may be coupled to the first movable unit (200). The sensing magnet (450) may be bonded to the first movable unit (200) using an adhesive. The sensing magnet (450) may be disposed on the bobbin (210). The sensing magnet (450) may be secured to the bobbin (210). The sensing magnet (450) may be coupled to the bobbin (210). The sensing magnet (450) may be bonded to the bobbin (210) using an adhesive. The sensing magnet (450) may be formed with a smaller size than that of the drive magnets (410, 420). This may minimize the impact of the sensing magnet (450) affected on the drive magnets (410, 420).

The sensing magnet (450) may be disposed opposite a correction (calibration) magnet (460). The sensing magnet (450) and the correction magnet (460) may be disposed opposite each other on the first movable unit (200). The sensing magnet (450) and the correction magnet (460) may be disposed opposite each other on the bobbin (210).

The camera device (10) may comprise a correction magnet (460). The correction magnet (460) may be a compensation magnet (460). The compensation magnet (460) may be disposed in the first movable unit (200). The compensation magnet (460) may be fixed to the first movable unit (200). The correction magnet (460) may be coupled to the first movable unit (200). The correction magnet (460) may be bonded to the first movable unit (200) using an adhesive. The correction magnet (460) may be disposed on the bobbin (210).

The correction magnet (460) may be secured to the bobbin (210). The correction magnet (460) may be coupled to the bobbin (210). The correction magnet (460) may be bonded to the bobbin (210) using an adhesive. The correction magnet (460) may be formed with a smaller size than that of the drive magnets (410, 420). By doing so, the impact of the correction magnet (460) on the drive magnets (410, 420) may be minimized. Additionally, the correction magnet (460) may be disposed opposite the sensing magnet (450) to form a magnetic force equilibrium with the sensing magnet (450). This may prevent tilting that may be caused by the sensing magnet (450).

The camera device (10) may comprise a sensing substrate (board, 470). The sensing substrate (470) may be a substrate. The sensing substrate (470) may be a printed circuit board (PCB). The sensing substrate (470) may be a flexible substrate. The sensing substrate (470) may be an FPCB. The sensing substrate (470) may be coupled to a first substrate (110). The sensing substrate (470) may be connected to the first substrate (110). The sensing substrate (470) may be electrically connected to the first substrate (110). The sensing substrate (470) may be soldered to the first substrate (110). The sensing substrate (470) may be disposed on the first holder (130). The sensing substrate (470) may be secured to the first holder (130). The sensing substrate (470) may be coupled to the first holder (130). The first holder (130) may comprise a groove or hole with a shape corresponding to that of the sensing substrate (470). The sensing substrate (470) may be disposed in the groove or hole of the first holder (130).

The camera device (10) may comprise a driver IC (480). The driver IC (480) may be an AF driver IC. The driver IC (480) may be electrically connected to the first coil (430). The driver IC (480) may apply a current to the first coil (430) to perform the AF driving. The driver IC (480) may apply a power to the first coil (430). The driver IC (480) may apply a current to the first coil (430). The driver IC (480) can apply a voltage to the first coil (430). The driver IC (480) may be disposed on the sensing substrate (470). The driver IC (480) may be disposed in a position corresponding to that of the sensing magnet (450). The driver IC (480) may be disposed facing the sensing magnet (450). The driver IC (480) may be disposed adjacent to the sensing magnet (450). The driver IC (480) may sense the sensing magnet (450).

The driver IC (480) may comprise a sensor. The sensor may comprise a Hall IC. The sensor may be disposed in a position corresponding to that of the sensing magnet (450). The sensor may be disposed facing the sensing magnet (450). The sensor may be disposed adjacent to the sensing magnet (450). The sensor may detect the sensing magnet (450). The sensor may detect a magnetic force of the sensing magnet (450). The sensor may detect a position of the first movable unit (200). The sensor may detect a movement of the first movable unit (200). The sensed value detected by the sensor may be used for feedback to drive the autofocus.

The camera device (10) may comprise a gyro sensor (490). The gyro sensor (490) may be disposed on the first substrate (110). The gyro sensor (490) may detect a shaking of the camera device (10). The gyro sensor (490) may sense an angular velocity or a linear velocity caused by the shaking of the camera device (10). The gyro sensor (490) may be electrically connected to the driver IC (495). The shaking of the camera device (10) detected by the gyro sensor (490) may be used for the image stabilization (OIS) driving.

The camera device (10) may comprise a driver IC (495). The driver IC (495) may be an OIS driver IC. The driver IC (495) may be electrically connected to the second coil (440). The driver IC (495) may apply a current to the second coil (440) to perform OIS driving. The driver IC (495) may apply a power to the second coil (440). The driver IC (495) can apply a current to the second coil (440). The driver IC (495) can apply a voltage to the second coil (440). The driver IC 495 may be disposed on the second substrate (310).

In a modification, the camera device (10) may comprise a connection substrate (board) as a configuration not disclosed in the drawings. The connection substrate may be a connection unit. The connection substrate may be a connection member. The connection substrate may be a flexible substrate. The connection substrate may be a flexible board. The connection substrate may be a board of flexibility. The connection substrate may be a flexible printed circuit board (FPCB). The connection substrate may be flexible in at least a portion. The second substrate (310) and the connection substrate may be integrally formed.

The connection substrate may support the second movable unit (300). The connection substrate may support movement of the second movable unit (300). The connection substrate may movably support the second movable unit (300) The connection substrate may connect the second movable unit (300) to the fixed unit (100). The connection board may connect the first substrate (110) and the second substrate (310). The connection substrate may electrically connect the first substrate (110) and the second substrate (310). The connection substrate can guide movement of the second movable unit (300). The connection substrate may guide the second movable unit (300) to move in a direction perpendicular to the optical axis direction. The connection substrate may guide the second movable unit (300) to rotate relative to the optical axis. The connection substrate may limit movement of the second movable unit (300) in the direction of the optical axis direction. A portion of the connection substrate may be coupled to the base (120).

The connection substrate may comprise a first portion coupled to the first substrate (110), a second portion coupled to the second substrate (310), and a third portion connecting the first and second portions. The third portion may be disposed at least partially parallel to the optical axis. The third portion may be formed such that its length along the optical axis is longer than its thickness. The second portion of the connection substrate may be disposed parallel to the second substrate (310) in at least some portions. The third portion of the connection substrate may be disposed perpendicular to the second portion in at least some portions.

The third portion of the connection substrate may be bent at a portion corresponding to a corner of the second substrate (310).

The camera device (10) may comprise an elastic member (700). The elastic member (700) may be a support member. The elastic member (700) may connect the fixed unit (100) and the first movable unit (200). The elastic member (700) may elastically connect the fixed unit (100) and the first movable unit (200). The elastic member (700) may connect the bobbin (210) and the first holder (130). The elastic member (700) may elastically connect the bobbin (210) and the first holder (130). The elastic member (700) may moveably support the first movable unit (200) relative to the fixed unit (100).

The elastic member (700) may deform as the first movable unit (200) is moved. The elastic member (700) can return the first movable unit (200) to its initial position via a resilient force when the movement of the first movable unit (200) ends. The elastic member (700) may comprise a leaf spring. The elastic member (700) may comprise a spring. The elastic member (700) may be elastic in at least a portion. The elastic member (700) may provide a resilient force to the first movable unit (200).

The camera device (10) may comprise an upper elastic member (710). The elastic member (700) may comprise the upper elastic member 710. The upper elastic member (710) may be disposed on top of a lower elastic member (720). The upper elastic member (710) may comprise an inner portion that engages the bobbin (210). The inner portion of the upper elastic member (710) may be coupled to an upper portion of the bobbin (210). The inner portion of the upper elastic member (710) may be disposed on a top surface of the bobbin (210). The upper elastic member (710) may comprise an outer portion that is coupled to the first holder (130). The outer portion of the upper elastic member (710) may be coupled to a lower portion of the first holder (130). The outer portion of the upper elastic member (710) may be disposed on an underside of the first holder (130). The upper elastic member (710) may comprise a connection unit connecting the inner and outer portions. The connection may have elasticity.

The upper elastic member (710) may comprise a plurality of lower elastic units. The upper elastic member (710) may comprise first and second upper elastic units (710-1, 710-2). The upper elastic member (710) may comprise two upper elastic units (710-1, 710-2). The two upper elastic units (710-1, 710-2) may be spaced apart from each other to electrically connect the sensing substrate (470) and the first coil (430). The upper elastic member (710) may comprise two upper elastic members (710). The two upper elastic members (710) may electrically connect the sensing substrate (470) and the first coil (430).

The camera device (10) may comprise a lower elastic member (720). The elastic member (700) may comprise the lower elastic member (720). The lower elastic member (720) may be disposed below the upper elastic member (710). The lower elastic member (720) may comprise an inner portion that engages the bobbin (210). The inner portion of the lower elastic member (720) may be coupled to a lower portion of the bobbin (210). The inner portion of the lower elastic member (720) may be disposed on a bottom side of the bobbin (210). The lower elastic member (720) may comprise an outer portion that is coupled to the first holder (130). The outer portion of the lower elastic member (720) may be coupled to a top surface of the first holder (130). The outer portion of the lower elastic member (720) may be disposed on a top surface of the first holder (130). The lower elastic member (720) may comprise a connection unit connecting the inner and outer portions. The connection may have elasticity.

The lower elastic member (720) may comprise a plurality of lower elastic units. The lower elastic member (720) may comprise first and second lower elastic units (720-1, 720-2). The lower elastic member (720) may comprise two lower elastic units (720-1, 720-2). The two lower elastic units (720-1, 720-2) may be spaced apart from each other to electrically connect the sensing substrate (470) and the first coil (430). The lower elastic member (720) may comprise two lower elastic members (720). The two lower elastic members (720) may electrically connect the sensing substrate (470) and the first coil (430). However, only one of the upper elastic member (710) and the lower elastic member (720) may be split into two and used for energizing the sensing board (470) and the first coil (430), while the other may be integrally formed as a single piece.

The camera device (10) may comprise a wire (800). The wire (800) may be a wire spring. The wire (800) may be an elastic member. The wire (800) may be a leaf spring, as a modification. The wire (800) may connect the fixed unit (100) and the second movable unit (300). The wire (800) may elastically connect the fixed unit (100) and the second movable unit (300). The wire (800) may connect the first substrate (110) and the second movable unit (300). The wire (800) may electrically connect the first substrate (110) and the second substrate (310). The wire (800) may moveably support the second movable unit (300). The wire (800) may support the second movable unit (300) to move or rotate in a direction perpendicular to the optical axis direction. The wire (800) may be disposed in the optical axis direction. The wire (800) may be disposed parallel to the optical axis. The wire (800) may be formed of a metal. The wire (800) may be formed of a conductive material. The wire (800) may be elastic in at least a portion.

The wire (800) may comprise a plurality of wires. The wire (800) may comprise 36 wires (800). Some of the plurality of wires (800) may be formed with a different thickness than that of the rest. Four wires (820) of the 36 wires (800) may be formed with a larger diameter than that of the remaining wires (810). Eight of the 36 wires (820) of the 36 wires (800) may be formed with a larger diameter than that of the remaining wires (810). Each of the plurality of wires (800) may be disposed parallel to the optical axis.

The wire (800) may comprise a first wire (810). A diameter of the first wire (810) (see d1 in FIG. 13) may be smaller than a diameter of the second wire (820) (see d2 in FIG. 13). The number of first wires (810) may be greater than the number of second wires (820). The first wire (810) and the second wire (820) may be formed of the same material. The first wire (810) and the second wire (820) may be spaced apart from each other.

The wire (800) may comprise a second wire (820). A diameter (d2) of the second wire (820) may be larger than a diameter (d1) of the first wire (810). The second wire (820) may have a larger diameter than that of the first wire (810). The second wire (820) may electrically connect the first substrate (110) and the image sensor (330). The second wire (820) can supply a current to the image sensor (330). The first substrate (110) can apply a power to the image sensor (330) via the second wire (820). The second wire (820) can supply a current to the driver IC (495). The first substrate (110) can apply a power to the driver IC (495) via the second wire (820).

The camera device (10) may comprise a damper (900). The damper (900) may comprise an adhesive material. The damper (900) may be viscous. The damper (900) may comprise an epoxy. The damper (900) may be disposed on the second wire (820). The damper (900) may not be disposed on the first wire (810). The damper (900) may connect the terminal (372) and the wire (800). The damper (900) may be disposed between the terminal (372) of terminal member (370) and the wire (800). The damper (900) may contact the terminals (372) of the terminal member (370) and the wire (800).

The damper (900) may be disposed at terminal (372) of terminal member (370) and the wire (800). The damper (900) may connect the wire (800), the terminal member (370), and the second holder (340). The damper (900) may be disposed among the wire (800), the terminal member (370), and the second holder (340). The damper (900) may be in contact with the wire (800), the terminal member (370), and the second holder (340). The damper (900) may be disposed on the wire (800), the terminal member (370), and the second holder (340). The damper (900) may be disposed on some of the plurality of wires (800) and not on others. In this case, the wires on which the dampers (900) are disposed may be formed with a larger diameter than that of the remaining wires.

In the exemplary embodiment, only the wires at the location where the damper (900) is applied may be formed with an increased diameter to prevent buckling (deformation) of the wires (800) upon impact. The diameter of four or eight of the 36 wires can be increased. In this embodiment, the diameter of the second wire (820) can be increased to increase a slack (extra) load.

FIG. 14 is a buckling analysis of the wire diameter of a camera device and damper application according to an exemplary embodiment of the present invention.

For a comparative example where the wire has a diameter of 30 um and no damper is applied, the buckling load may be 20.0 mN and the spring load may be 2.5 mN, resulting in a slack load of 17.5 mN.

If the wire has a diameter of 60 um, such as the second wire 820 of the embodiment, and the damper (900) is applied, the buckling load may be 320.0 Nm and the spring load may be 2.6 mN, resulting in a free load of 317.4 mN. In other words, the embodiment achieves a larger free load than the comparative example. This can improve the wire deformation phenomenon that occurs after the impact test, i.e., the reliability margin can be secured.

In the comparative example and the present embodiment, the wire may be 2.27 mm long. The buckling load may be a minimum load at which wire buckling occurs. The spring load may be a compressive force that the terminals (372) of the terminal member (370) are elastically subjected to. The slack load may be the buckling load minus the spring load. The slack load may be a margin that can accommodate the damping load and the shock load. The larger the slack load value, the greater the protection against wire buckling.

FIG. 15 is an illustration of current heating simulation results per diameter of wire of a camera device according to an exemplary embodiment of the present invention.

If the wire is 30 um in diameter, it can be confirmed that it will heat up to 2123.3 degrees Celsius when an input current of 600 mA is applied for 300 seconds (sec). If the diameter of the wire is 35 um, it can be confirmed that it heats up to 1601.3 degrees Celsius when an input current of 600 mA is applied for 300 seconds (sec). If the diameter of the wire is 40 um, it can be confirmed that it heats up to 1272.9 degrees when an input current of 600 mA is applied for 300 seconds (sec). If the diameter of the wire is 45 um, it can be confirmed that it heats up to 1061.6 degrees Celsius when an input current of 600 mA is applied for 300 seconds (sec)

If the wire is 50 um in diameter, it can be confirmed that it will heat up to 922.2 degrees Celsius when an input current of 600 mA is applied for 300 seconds (sec). If the diameter of the wire is 55 um, it can be confirmed that it heats up to 827.0 degrees Celsius when an input current of 600 mA is applied for 300 seconds (sec). If the diameter of the wire is 60 um, it can be confirmed that it heats up to 759.8 degrees when an input current of 600 mA is applied for 300 seconds (sec). If the diameter of the wire is 65 um, it can be confirmed that it heats up to 711.0 degrees when an input current of 600 mA is applied for 300 seconds (sec).

In the present embodiment, the power circuit of the image sensor (330) or the driver IC (495) can be arranged at a location where the thick wire is applied to reduce the current heating temperature so that a relatively high current can be supplied.

Hereinafter, operation of the camera device according to the present embodiment will be described with reference to the drawings.

FIG. 16 is a drawing to illustrate the operation of an autofocus function of a camera device according to an exemplary embodiment of the present invention.

When power is applied to the first coil (430) of the camera device (10) according to an exemplary embodiment of the present invention, an electromagnetic field is formed in the first coil (430) such that the first coil (430) can move in the optical axis direction (z-axis direction) through electromagnetic interaction with the first magnet (410). In this case, the first coil (430) can move in the optical axis direction with the first movable unit (200) comprising the lens (220). In this case, the lens (220) may be moved away from or closer to the image sensor (330) so that the focus of the subject may be adjusted. One or more of a current and a voltage may be applied to apply a power the first coil (430).

When a current of the first direction is applied to the first coil (430) of the camera device (10) according to this embodiment, the first coil (430) can move in the upward direction of the optical axis direction (see a in FIG. 16) through electromagnetic interaction with the first magnet (410). At this time, the first coil (430) can move the lens (220) in the upward direction of the optical axis direction to move away from the image sensor (330).

When a current of a second direction opposite to the first direction is applied to the first coil (430) of the camera device (10) according to the present embodiment, the first coil (430) may move in the downward direction (see b in FIG. 16) of the optical axis direction through electromagnetic interaction with the first magnet (410). At this time, the first coil (430) can move the lens (220) to the downward direction of the optical axis direction to be closer to the image sensor (330).

FIGS. 17, 18 and 19 are drawings to illustrate operation of handshaking correction function of a camera device according to an embodiment.

When power is applied to the second coil (440) of the camera device (10) according to an exemplary embodiment of the present invention, an electromagnetic field is formed in the second coil (440) such that the second coil (440) can move in a direction perpendicular to the optical axis direction through electromagnetic interaction with the second magnet (420). In addition, the second coil (440) can be rotated about the optical axis through electromagnetic interaction with the second magnet (420). At this time, the second coil (440) may move or rotate with the second movable unit (300), which comprises the image sensor (330). In the present exemplary embodiment, the second coil (440) may move the image sensor (330) to compensate for shaking of the camera device (10) detected by the gyro sensor (490).

FIG. 17 is a drawing to illustrate an operation in which an image sensor of a camera device according to an exemplary embodiment of the present invention is shifted along an x-axis.

When a current in the first direction is applied to the second-1 coil (441) of the camera device (10) according to an exemplary embodiment of the present invention, the second-1 coil (441) may move in one of the first directions (x-axis direction) perpendicular to the optical axis direction (see a in FIG. 17) through electromagnetic interaction with the second magnet (420). At this time, the second-1 coil (441) may move the image sensor (330) in one of the first directions perpendicular to the optical axis direction. Conversely, when current is applied to the second-1 coil (441) in a second direction opposite to the first direction, the second-1 coil (441) can move in the other direction of the first direction perpendicular to the optical axis direction (x-axis direction) through electromagnetic interaction with the second magnet 420. At this time, the second first coil 441 may move the image sensor (330) in the other direction of the first directions perpendicular to the optical axis direction.

FIG. 18 is a drawing to illustrate an operation in which an image sensor of a camera device according to an exemplary embodiment of the present invention is shifted along a y-axis.

When a current in the first direction is applied to the second-2 coil (442) of the camera device (10) according to an exemplary embodiment of the present invention, the second-2 coil (442) may move in one of the second directions (y-axis direction) perpendicular to the optical axis direction (see b in FIG. 18) through electromagnetic interaction with the second magnet (420). At this time, the second-2 coil (442) can move the image sensor (330) in one of the second directions perpendicular to the optical axis direction. Conversely, when current is applied to the second-2 coil (442) in a second direction opposite to the first direction, the second-2 coil (442) may move in a second direction perpendicular to the optical axis direction (y-axis direction) through electromagnetic interaction with the second magnet (420). At this time, the second coil (442) can move the image sensor (330) in the other direction of the second directions perpendicular to the optical axis direction.

FIG. 19 is a drawing to illustrate an operation in which an image sensor of a camera device according to an exemplary embodiment of the present invention is rolled about a z-axis.

When a current in the first direction is applied to the second-1 coil (441) and the second-2 coil (442) of the camera device 10 according to an exemplary embodiment, the second-1 coil (441) and the second-2 coil (442) can be rotated in a first direction about the optical axis through electromagnetic interaction with the second magnet 420 (see c in FIG. 19). At this time, the second-1 coil (441) and the second-2 coil (442) can rotate the image sensor (330) in a one direction about the optical axis. In this case, the one direction may be counterclockwise. Conversely, when a current in a second direction opposite to the first direction is applied to the second-1 coil (441) and the second-2 coil (442), the second-1 coil (441) and the second-2 coil (442) can be rotated in the other direction about the optical axis through electromagnetic interaction with the second magnet (420). In this case, the second-1 coil (441) and the second-2 coil (442) can rotate the image sensor (330) in the other direction about the optical axis. In this case, the other direction may be clockwise.

Hereinafter, an optical instrument will be described with reference to the accompanying drawings according to an exemplary embodiment of the present invention.

FIG. 20 is a perspective view of an optical instrument according to an exemplary embodiment of the present invention, and FIG. 21 is a perspective view of an optical instrument according to an exemplary embodiment of the present invention, from a different direction than FIG. 20.

The optical instrument (1) may comprise one or more of the following: a cell phone, a mobile phone, a handheld device, a smart phone, a smart pad, a portable smart device, a digital camera, a laptop computer, a digital broadcasting device, a personal digital assistant (PDA), a portable multimedia player (PMP), and a navigation device. The optical instrument (1) may comprise any device for taking images or photographs.

The optical instrument (1) may comprise a body (20). The optical instrument (1) may comprise a camera device (10). The camera device (10) may be disposed on the body (20). The camera device 10 may photograph a subject. The optical instrument (1) may comprise a display (30). The display (30) may be disposed on the body (20). The display (30) may output at least one of a video and an image taken by the camera device (10). The display (30) may be disposed on a first surface of the body (20). The camera device (10) may be disposed on one or more of a first surface of the body (20) and a second surface opposite the first surface.

While the exemplary embodiments of the present invention have been described with reference to the accompanying drawings, one having ordinary skill in the art to which the present invention belongs will understand that the invention may be practiced in other specific forms without altering its technical ideas or essential features. It should therefore be understood that the embodiments described above are exemplary and non-limiting in all respects.

The invention claimed is:

1. A camera device, comprising:
a lens;
an image sensor disposed below the lens;
an optical image stabilization (OIS) drive unit configured to move the image sensor relative to the lens in a direction perpendicular to an optical axis direction; and
a plurality of wires electrically connected with the image sensor,
wherein some of the plurality of wires have a larger diameter than remaining wires of the plurality of wires, and
wherein the some of the plurality of wires are disposed parallel with the remaining wires.

2. The camera device of claim 1, comprising a damper disposed on the some of the plurality of wires,
wherein the some of the plurality of wires and the remaining wires are disposed parallel with an optical axis.

3. The camera device of claim 2, comprising a terminal member coupled with the plurality of wires,
wherein the terminal member is disposed perpendicular to the plurality of wires, and
wherein a damper is not disposed on the remaining wires.

4. The camera device of claim 1, comprising:
a fixed unit comprising a first substrate; and
a second movable unit comprising a second substrate,
wherein the image sensor is electrically connected to the second substrate, and wherein the plurality of wires connect the first substrate and the second substrate.

5. The camera device of claim 4, comprising:
a first movable unit disposed in the fixed unit; and
an auto focus (AF) drive unit configured to move the first movable unit relative to the fixed unit in the optical axis direction,
wherein the first movable unit comprises a lens.

6. A camera device, comprising:
a fixed unit;
a lens disposed in the fixed unit;
a second movable unit comprising an image sensor disposed below the lens;
a second drive unit configured to move the second movable unit relative to the fixed unit in a direction perpendicular to an optical axis direction; and
a plurality of wires connecting the fixed unit and the second movable unit,
wherein some of the plurality of wires are formed of a different thickness than remaining wires of the plurality of wires, and
wherein the some of the plurality of wires are disposed parallel with the remaining wires.

7. The camera device of claim 6, comprising a first movable unit disposed in the fixed unit,
wherein the first movable unit comprises the lens,
wherein the fixed unit comprises a first substrate, and
wherein the plurality of wires connect the first substrate and the second movable unit.

8. The camera device of claim 7, comprising a first drive unit configured to move the first movable unit relative to the fixed unit in the optical axis direction; and
a terminal member coupled with the plurality of wires,
wherein the some of the plurality of wires and the remaining wires are disposed parallel with an optical axis, and
wherein the terminal member is disposed perpendicular to the plurality of wires.

9. The camera device of claim 6, wherein the some of the plurality of wires have a larger diameter than the remaining wires.

10. The camera device of claim 9, comprising a damper disposed on the some of the plurality of wires.

11. The camera device of claim 9, wherein a damper is not disposed on the remaining wires.

12. The camera device of claim 10, wherein the second movable unit comprises a second substrate disposed with the image sensor, a second holder coupled with the second substrate, and a terminal member coupled with the second holder,
wherein the terminal member comprises a body unit, and a terminal disposed on the body unit, and
wherein the terminal comprises a first portion disposed on the body unit, a second portion extending from the first portion and coupled with a wire of the plurality of wires, and a third portion extending from the first portion and coupled with the second substrate.

13. The camera device of claim 12, wherein the damper connects the terminal and the some of the plurality of wires.

14. The camera device of claim 12, wherein the damper connects the some of the plurality of wires, the terminal member, and the second holder.

15. The camera device of claim 7, wherein the some of the plurality of wires electrically connect the first substrate and the image sensor, and
wherein the some of the plurality of wires are configured to supply a current to the image sensor.

16. The camera device of claim 12, comprising a driver IC disposed on the second substrate of the second moving unit and electrically connected with the second drive unit, and
wherein the some of the plurality of wires are configured to supply a current to the driver IC.

17. The camera device of claim 6, wherein the plurality of wires comprise thirty-six wires, and
wherein four wires of the thirty-six wires are formed with a larger diameter than the remaining wires.

18. The camera device of claim 9, wherein the plurality of wires comprise thirty-six wires, and
wherein eight wires of the thirty-six wires are formed with a larger diameter than the remaining wires.

19. An optical instrument, comprising:
a body;
the camera device of claim 6 disposed on the body; and
a display disposed on the body and outputting a video or an image taken by the camera device.

20. A camera device, comprising:
a fixed unit comprising a first substrate;
a first movable unit comprising a lens;
a second movable unit comprising an image sensor disposed below the lens;
a first drive unit configured to move the first movable unit with respect to the fixed unit in an optical axis direction;
a second drive unit configured to move the second movable unit with respect to the fixed unit in a direction perpendicular to the optical axis direction;
a wire connecting the first substrate and the second movable unit; and
a damper connecting the wire and the second movable unit and having a viscosity,
wherein the wire comprises a plurality of wires electrically connected with the image sensor,
wherein some of the plurality of wires have a larger diameter than remaining wires of the plurality of wires, and
wherein the some of the plurality of wires are disposed parallel with the remaining wires.

* * * * *